US011487307B2

(12) United States Patent  (10) Patent No.: US 11,487,307 B2
Allen et al.  (45) Date of Patent: Nov. 1, 2022

(54) METHOD AND SYSTEM FOR PROVIDING A CENTRALIZED APPLIANCE HUB

(71) Applicant: Overcast Innovations LLC, Seattle, WA (US)

(72) Inventors: Dean C. Allen, Seattle, WA (US); Douglas James Moore, Seattle, WA (US); Andrea M. Doyle, Seattle, WA (US); Larry Paul Highley, Edgewood, WA (US)

(73) Assignee: OVERCAST INNOVATIONS LLC, Seattle, WA (US)

( * ) Notice: Subject to any disclaimer, the term of this patent is extended or adjusted under 35 U.S.C. 154(b) by 664 days.

(21) Appl. No.: 16/459,509

(22) Filed: Jul. 1, 2019

(65) Prior Publication Data

US 2020/0033900 A1   Jan. 30, 2020

Related U.S. Application Data

(60) Provisional application No. 62/860,318, filed on Jun. 12, 2019, provisional application No. 62/693,311, filed on Jul. 2, 2018.

(51) Int. Cl.
*G05D 23/19* (2006.01)
*G05B 15/02* (2006.01)
(Continued)

(52) U.S. Cl.
CPC .......... *G05D 23/1917* (2013.01); *A62C 3/00* (2013.01); *A62C 99/0072* (2013.01);
(Continued)

(58) Field of Classification Search
CPC .. G05D 23/1917; A62C 3/00; A62C 99/0072; A62C 35/68; G05B 15/02;
(Continued)

(56) References Cited

U.S. PATENT DOCUMENTS

2002/0011956 A1* 1/2002 Ito ............................ H01Q 5/28
  343/702
2002/0141181 A1* 10/2002 Bailey ........................ F21S 2/00
  362/148

(Continued)

FOREIGN PATENT DOCUMENTS

JP    2013072626 A    4/2013

OTHER PUBLICATIONS

International Search Report and Written Opinion issued for PCT/US2019/040198 and dated Oct. 31, 2019, 13 pages.

*Primary Examiner* — Tuan C Dao
(74) *Attorney, Agent, or Firm* — Perkins Coie LLP

(57) ABSTRACT

An appliance hub for use in an upper portion of an enclosure can include a substrate configured to be positioned in an upper portion of an enclosure. The appliance hub can include a climate control apparatus mounted on the substrate and the climate control apparatus can be configured to regulate a temperature within the enclosure. The appliance hub can include one or more lighting elements configured to provide light within the enclosure, a plurality of fluid lines connected to the substrate and configured to provide fluid service and return to the climate control apparatus, and/or a plurality of electrical connections connected to the substrate and configured to provide electrical power and/or data to at least one of the climate control apparatus and the one or more lighting elements.

49 Claims, 21 Drawing Sheets

(51) Int. Cl.
  *G06N 20/00* (2019.01)
  *G08B 21/16* (2006.01)
  *A62C 3/00* (2006.01)
  *A62C 99/00* (2010.01)
  *G08B 21/14* (2006.01)
(52) U.S. Cl.
  CPC ............. *G05B 15/02* (2013.01); *G06N 20/00* (2019.01); *G08B 21/14* (2013.01); *G08B 21/16* (2013.01); *G05B 2219/2614* (2013.01)
(58) Field of Classification Search
  CPC ............ G05B 2219/2614; G06N 20/00; G08B 21/14; G08B 21/16; G08B 5/36; G08B 17/10; F24F 2110/00; F24F 2130/40; F24F 13/24
  See application file for complete search history.

(56) References Cited

U.S. PATENT DOCUMENTS

| | | | | |
|---|---|---|---|---|
| 2004/0117506 | A1* | 6/2004 | Ito | H04L 67/14 340/9.16 |
| 2004/0121114 | A1* | 6/2004 | Piana | D06M 11/70 427/372.2 |
| 2004/0216895 | A1* | 11/2004 | Boyce | A62C 3/16 169/61 |
| 2005/0141216 | A1 | 6/2005 | McCarthy | |
| 2006/0162566 | A1* | 7/2006 | Kondo | A61L 9/16 96/146 |
| 2007/0095659 | A1* | 5/2007 | Yasuda | C25F 7/00 257/E21.303 |
| 2008/0037241 | A1* | 2/2008 | Von Der Brelie | H05B 47/175 362/234 |
| 2008/0168841 | A1* | 7/2008 | Matsuo | G10K 9/22 73/649 |
| 2008/0268386 | A1* | 10/2008 | Lin | A61L 9/03 431/8 |
| 2009/0223682 | A1* | 9/2009 | Ramos | A62C 3/025 169/53 |
| 2009/0277971 | A1* | 11/2009 | Scott | B05B 17/0669 239/4 |
| 2009/0301601 | A1* | 12/2009 | Enerson | C06B 43/00 141/38 |
| 2012/0155027 | A1* | 6/2012 | Broome | H05K 7/2039 361/688 |
| 2013/0233532 | A1* | 9/2013 | Imwalle | H05K 7/20745 165/287 |
| 2016/0011067 | A1* | 1/2016 | Rothstein | G01L 17/00 73/146.5 |
| 2016/0209076 | A1 | 7/2016 | Hirsch et al. | |
| 2016/0274024 | A1* | 9/2016 | Han | G01N 1/22 |
| 2017/0064872 | A1* | 3/2017 | Rogers | G06F 1/20 |
| 2017/0089047 | A1* | 3/2017 | Kovscek | E03B 7/071 |
| 2018/0027638 | A1* | 1/2018 | Takacs | H05B 47/105 315/308 |
| 2018/0066838 | A1 | 3/2018 | Huang et al. | |
| 2018/0142935 | A1* | 5/2018 | Jacobi | F25B 13/00 |
| 2018/0180304 | A1 | 6/2018 | Olsen | |
| 2018/0220546 | A1* | 8/2018 | Meldrum | H05K 7/1492 |

* cited by examiner

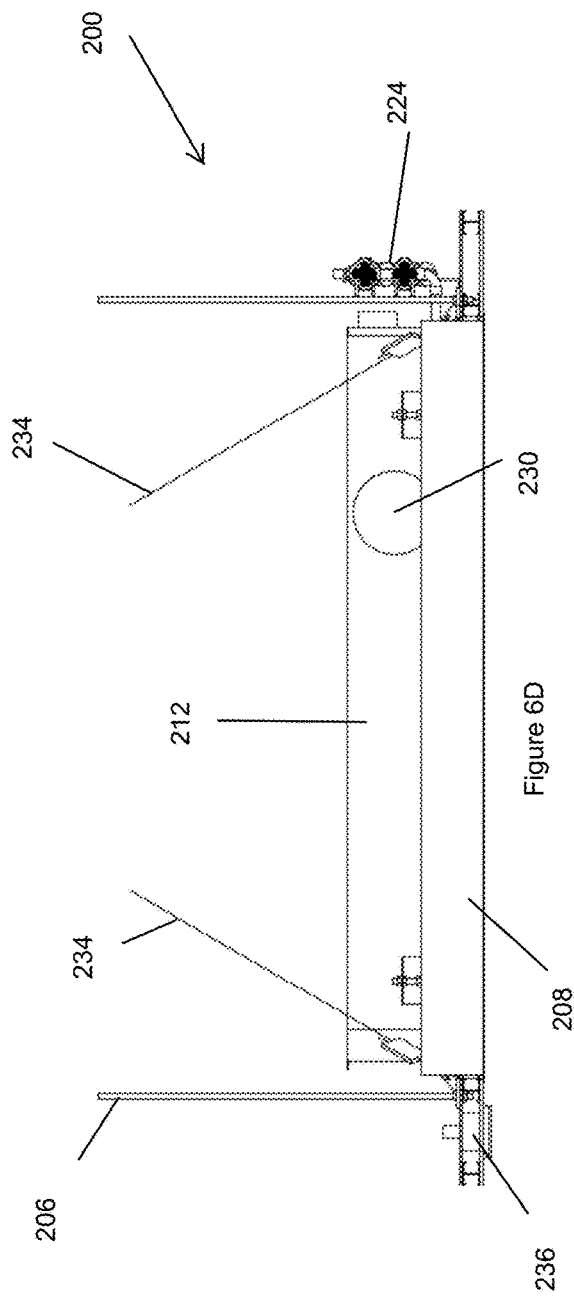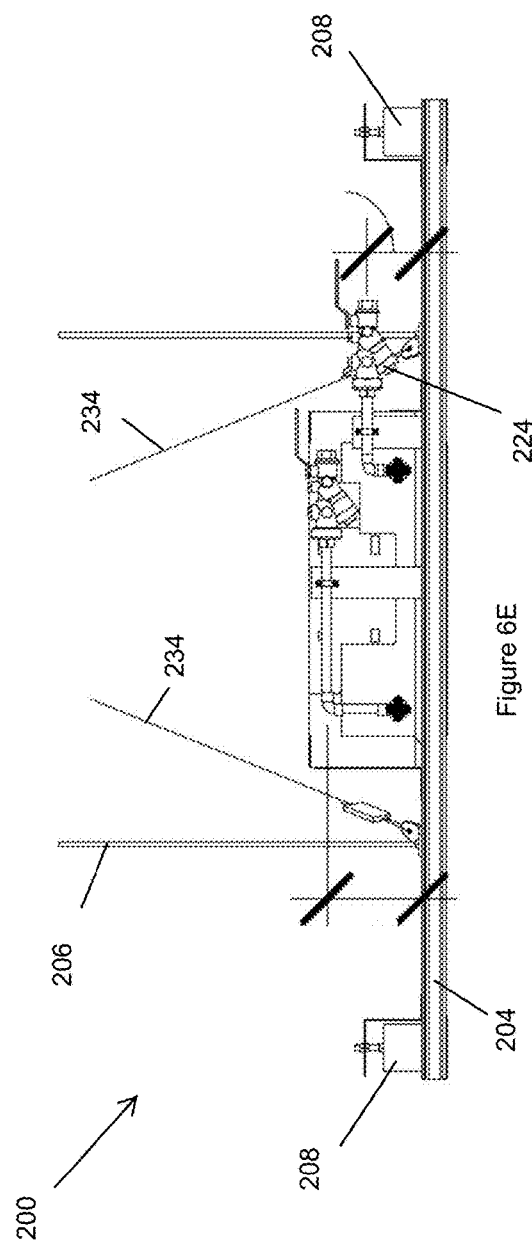

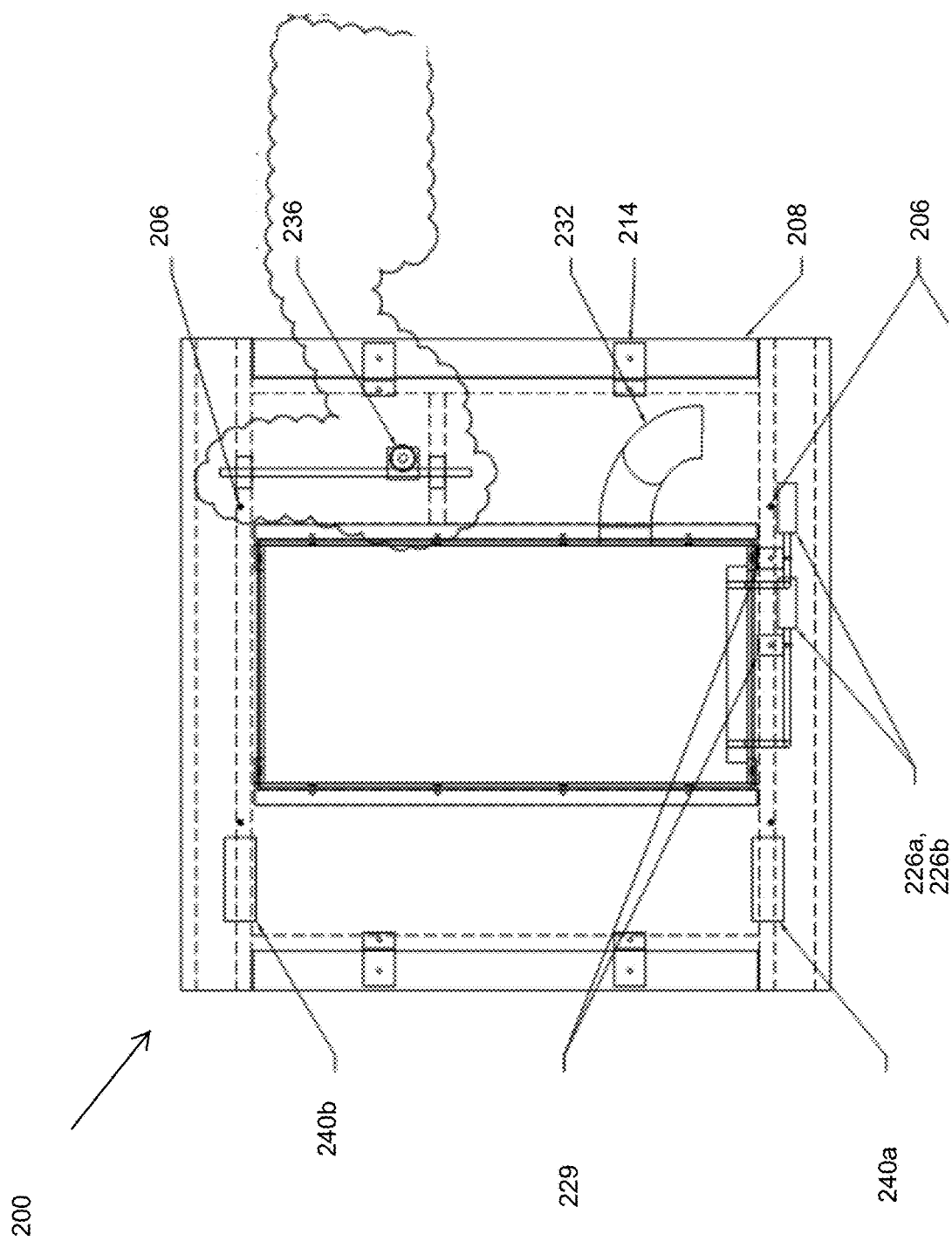

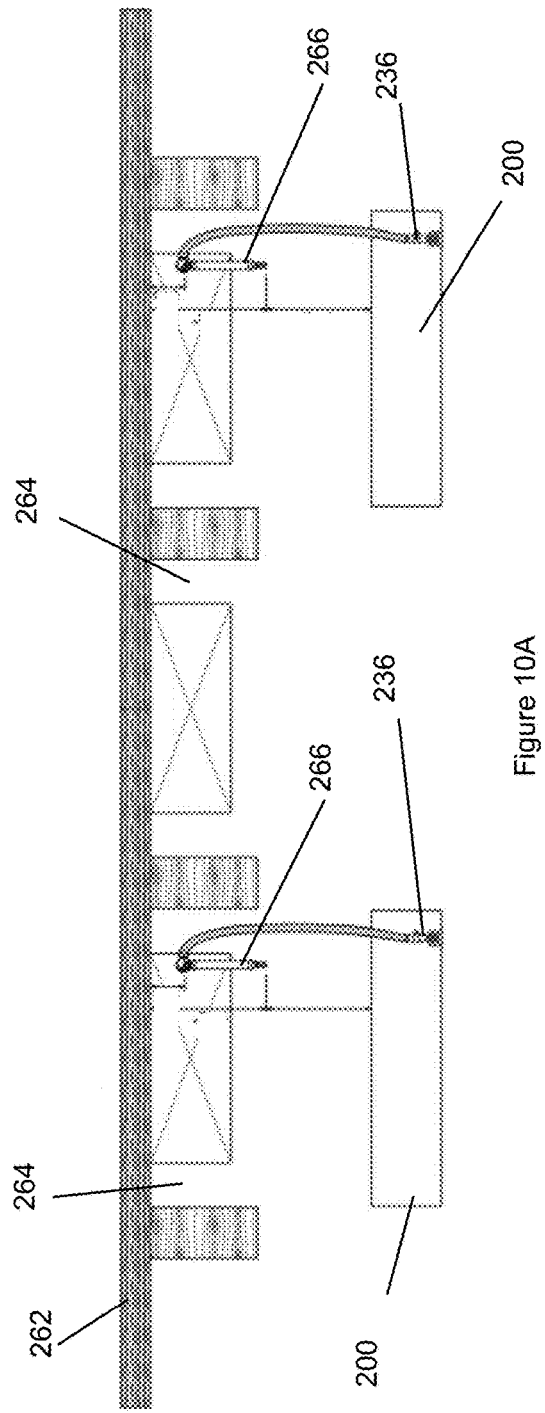
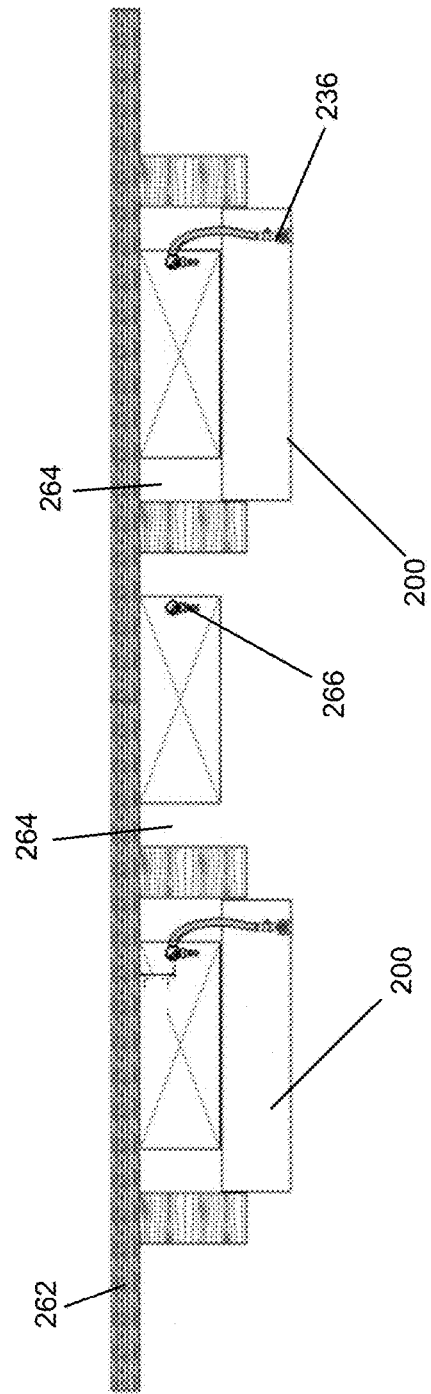

METHOD AND SYSTEM FOR PROVIDING A CENTRALIZED APPLIANCE HUB

CROSS-REFERENCE TO RELATED APPLICATIONS

The present application claims priority to U.S. Provisional App. No. 62/693,311, filed Jul. 2, 2018, entitled METHOD AND SYSTEM FOR PROVIDING A CENTRALIZED APPLIANCE HUB INTEGRATED WITH AN ACOUSTIC CLOUD and to U.S. Provisional App. No. 62/860,318, filed Jun. 12, 2019, entitled METHOD AND SYSTEM FOR PROVIDING A CENTRALIZED APPLIANCE HUB INTEGRATED WITH AN ACOUSTIC CLOUD. Both of these provisional applications are hereby incorporated by reference herein in their entirety and made part of the present disclosure.

TECHNICAL FIELD

The present technology generally relates to integrated and centralized communications, monitoring, climate control, and/or mechanical, electrical, plumbing (MAP) systems integrated with acoustic ceiling appliances.

BACKGROUND

As energy codes have become more stringent, the costs associated with controlling indoor climates have risen. Many traditional climate control systems, such as variable air volume ("VA") systems and constant air volume ("CAVE") systems, are now becoming cost-prohibitive due to high electricity usage associated with moving air and the rising costs of electricity. The costs associated with installing and maintaining climate control systems are also very high, as multi-person crews are often necessary to custom-fit wiring, ducking, piping, and other overhead in a given structure.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology.

FIG. 6D is a left side plan view of the appliance hub of FIG. 6A.

FIG. 6E is a front plan view of the appliance hub of FIG. 6A.

FIG. 6F is a top plan view of the appliance hub of FIG. 6A with an installed elbow duct and control panels.

FIG. 10A is a lateral plan view of a plurality of appliance hubs installed in a room and spaced from a ceiling.

FIG. 10B is a lateral plan view of a plurality of appliance hubs installed in a room and positioned close to the ceiling.

DETAILED DESCRIPTION

Figure 1:
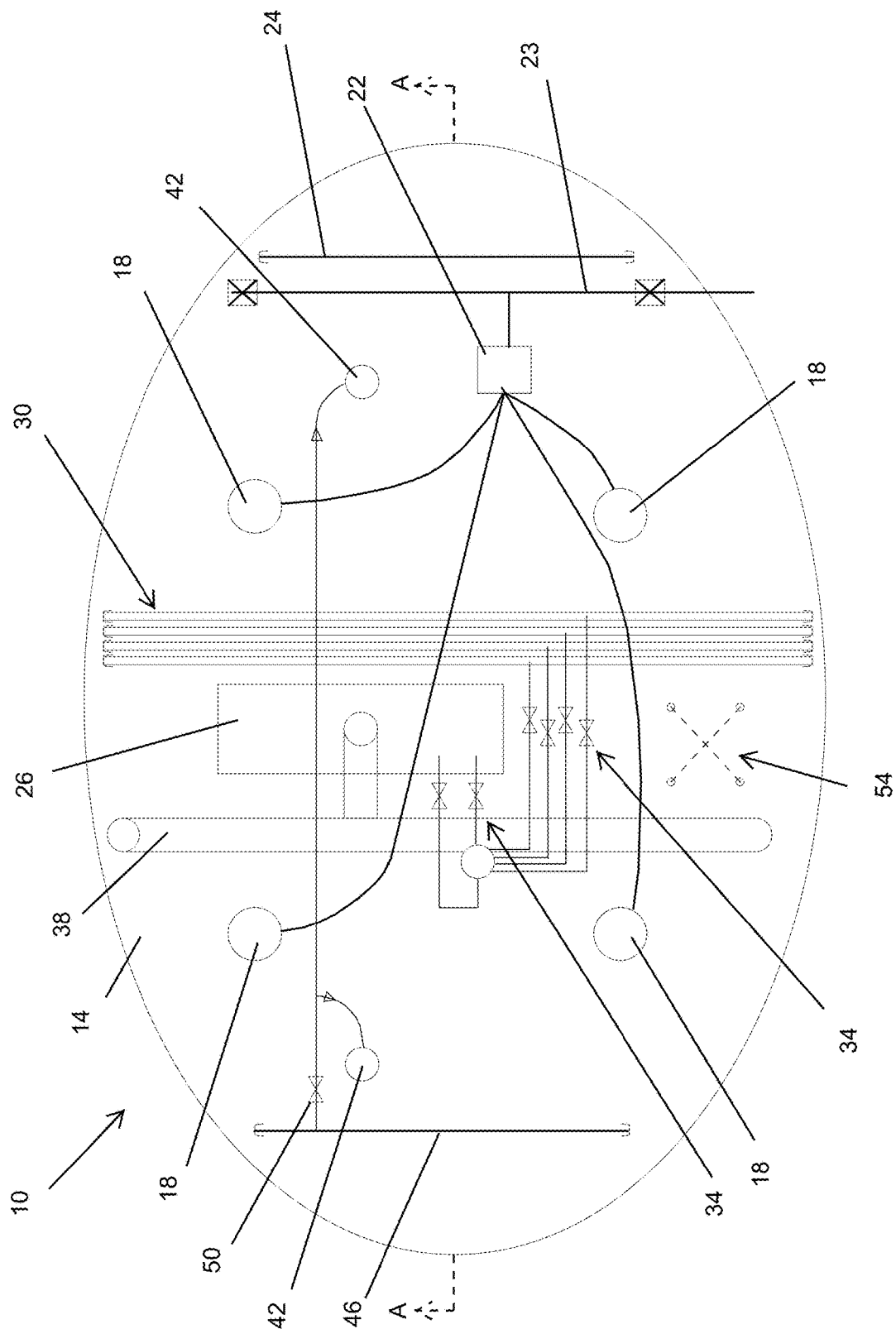
FIG. 1 is schematic illustration of an appliance hub having various components.

In many newly constructed or remodeled structures, designers, architects, and/or building owners elect to avoid the use of traditional drop ceilings, often in favor of maintaining visibility of the structural components of the enclosure ceiling. Forgoing use of drop ceilings can lead to several challenges. These challenges include sound propagation and the need to provide sufficient lighting, climate control structure, and supporting hardware while avoiding prominence of unsightly wiring and ducking in the enclosure.

Specific details of several embodiments of acoustic appliance hubs for use in enclosures, as well as associated systems and methods, are described below. As used herein, an "enclosure" can be a room or other enclosed or partially enclosed space, including spaces having full ceilings, partial ceilings, no ceilings, complete wall perimeters, partial-perimeter walls (e.g., one of more open sides), and/or other indoor or partially indoor spaces. The appliance hubs, sometimes referred to as panels, clouds, acoustic panels, or acoustic clouds, can be positioned in the upper portions of enclosures. The appliance hubs can be installed such that they do not create plenum within the enclosure. In some embodiments, the space between the appliance hubs and each other/the ceiling can allow for additional light (e.g., sunlight) to fill a space than would be the case if the appliance hubs formed a plenum. In some applications, the appliance hubs can be mounted along or near a wall of an enclosure. The enclosures can include, but are not limited to, classrooms, offices, concert halls, foyers, cafeterias, restaurants, residential rooms, warehouses, etc. The appliance hubs can be installed in original construction projects, or retrofit ted to existing structure or enclosure. The appliance or appliance hub can include a sound-absorbing substrate. Other components can be mounted onto or into the substrate. For example, the appliances can include a climate control apparatus configured to regulate a temperature within the enclosure, one or more lighting elements configured to provide light within the enclosure, a fire suppression apparatus configured to suppress flames within the enclosure, a plurality of fluid lines configured to provide fluid service and return to one or both of the fire suppression apparatus and the climate control apparatus, and/or a plurality of electrical connections connected to the sound-absorbing substrate and configured to provide electrical power and/or data to at least one of the climate control apparatus, the fire suppression apparatus, and the one or more lighting elements. As used herein, "fluid" refers to one or both of a liquid (e.g., water, refrigerant, etc.) And a gas (air, conditioned air, etc.). Preferably, the appliances include one or more of a sound level sensor, a motion sensor (e.g., an infrared sensor), a camera, a microphone, an air quality monitor, a carbon dioxide sensor, a carbon monoxide sensor, a smoke detector, a light level sensor, a heat sensor, a room temperature sensor, a dew point sensor, and a humidity sensor.

FIG. 1 provides a schematic illustration of an embodiment of an App lance or appliance hub 10. As illustrated, the appliance hub 10 can include a substrate 14. The substrate 14 can be configured to absorb sound, reflect light, contribute to an aesthetic theme of the enclosure in which the appliance hub is installed, and/or provide other desired functions. In some embodiments, sound-absorbing material can be attached/detached from the substrate 14 via hook-and-loop fasteners, magnets, flanges, and/or other attachment mechanisms. Detachability of the sound-absorbing material can allow for reuse of the sound-absorbing material when new and/or replacement appliance hubs are installed. Detachability of the sound-absorbing material can also allow for quick and easy modification to the look of the appliance hub 10. For example, different-colored, textured, and/or shaped sound-absorbing material portions can be swapped out for each other to provide a desired look for the appliance hub 10. In some embodiments, the sound-absorbing material is connected to the substrate 14 such that a gap remains between the sound-absorbing material and a bottom surface of the substrate 14. Maintaining a gap between the sound-absorbing material and the substrate 14 for at least a portion of the sound-absorbing material can enhance the noise reduction provided by the sound-absorbing material. Specifically, sound waves can deflect between the sound-absorbing material and the substrate 14, thereby increasing the sound-absorption affected by the sound-absorbing material. The substrate 14 can have a top surface facing the upper structure or bottom of the deck of the enclosure, and the bottom surface facing the floor of the enclosure.

When observed from below, the substrate 14 can have a generally rounded shape (e.g., circular or oval shape), a polygonal shape, an irregular shape (e.g., a cloud shape, an asymmetric shape, etc.), and/or some combination thereof. The substrate 14 can include rigid structures configured to maintain the shape of the substrate 14. In some applications, the substrate 14 is at least partially covered by a non-rigid, roughen ed, irregular, soft, and/or some other type of material. Sound-absorbing materials (e.g., open cell foams, sponges, porous materials, resonant absorber material, polyester, and/or other materials) may be used to cover or form the outer surface of all or a portion of the substrate 14. The materials (e.g., sound-absorbing materials) used to cover the substrate 14 can be fire-resistant (e.g., CL and/or ETL compliant). In some embodiments, the materials are produced from recycled products. In some applications, other components of the appliance hub are fire-resistant and/or CL/ETL compliant (e.g., chilled beam(s), light fixture(s), controls, power supplies, etc.).

In some embodiments, the substrate 14 has a maximum width, as measured parallel to the floor of the enclosure in which the appliance hub 10 is installed (or parallel to a wall on which the appliance hub 10 is installed in some embodiments), of less than 5 feet, less than 6 feet, less than 8 feet, less than 12 feet, and/or less than 18 feet. In some embodiments, the maximum width of the substrate 14, as measured parallel to the floor of the enclosure in which the appliance hub 10 is installed is greater than 2 feet, greater than 3 feet, greater than 6 feet, greater than 10 feet, and/or greater than 18 feet. The substrates 14 can be manufactured in various sizes, shapes, materials, and configurations to allow for convenient fit of the substrates 14 into various installation sites.

The substrate 14, or some portion thereof, may be releasably mounted at an installation site. For example, the substrate 14 can include mounting features configured to mount to preexisting structures (e.g., beams, framing, etc.) And/or to pre-mounted adapters in the enclosure. The substrate 14 can be mounted to various positions within the enclosure, including at or near the ceiling or walls of the enclosure. In some applications, raceways (e.g., tracks) can be installed in a given enclosure to allow for mounting of the substrates 14. The raceways may extend vertically and/or horizontally. In some embodiments, the raceways provide defined path(s) for movement of the substrates 14 along the raceways without detaching the substrates 14 from the raceways. For example, the raceways can include one or more flanges or channels configured to interface with mounting channels or flanges on the appliance hub 10.

One or more components can be mounted onto and/or into the substrate 14. Arrangement and inclusion/exclusion of components on the substrate 14 can be customized for the desired installation (e.g., classrooms v. Offices (private or open) v. Conference rooms, etc.) As illustrated in FIG. 1, the appliance hub 10 can include one or more lighting elements 18. The lighting elements 18 can be, for example, light-emitting diodes ("LEDs"), incandescent sockets and bulbs, halogen sockets and bulbs, fluorescent sockets and bulbs, smart bulbs, and/or some other type of lighting element. In some embodiments, the lighting elements 18 are retractable (e.g., can hang downward as pendant lights and be retracted back to the substrate 14). Preferably, the lighting elements 18 are low-voltage (e.g., 24V, 48V, 120V, or 220V). The lighting elements 18 can be configured to dim or brighten in response to control signals. The substrate 14 can include a local light control module 22. In some embodiments, the light control module 22 is positioned somewhere separate from the substrate 14. The light control module 22 can be configured to control the operation of the lighting elements 18. For example, the light control module 22 can control ON/OFF, dimming, strobing, and/or other lighting behavior. The light control module 22 can be configured to operate automatically. For example, ON/OFF schedules, desired enclosure brightness levels, red-green-blue (RIB) characteristics, and/or other target light characteristics can be programmed into the light control module 22. In some embodiments, the light control modules 22 are configured to operate the lighting elements 18 in a circadian rhythm pattern wherein the hue, intensity, brightness, and/or color of the light emitted from the lighting elements 18 varies over the course of a day (e.g., warmer in the morning and cooler as the day progresses). In some configurations, two or more of the lighting elements 18 can be configured to emit different colors of light. In some such embodiments, the light control module 22 can be configured to control the operation of the lighting elements 18 to control the net color output from the appliance hub 10. In some embodiments, the light control module 22 is connected to one or more of a lighting power line 23 (e.g., a low voltage power line) and/or a general tenant power line 24 connected to an outside power source. In some embodiments, one or more batteries are positioned on or in the substrate 14 to power various components (e.g., lighting elements, controllers, etc.). In some embodiments, the batteries operate primarily or solely as backup power in the case of a power outage. Preferably, most or all of the components of the appliance hubs 10 are reusable and/or recyclable. Use of reusable/recyclable components can reduce waste production.

The appliance hub 10 can include a climate control apparatus 26 mounted onto and/or into the substrate. The climate control apparatus 26 can be, for example, a chilled beam. Other possible climate control apparatuses can include fans, radiant heat pipes, cold water pipes, hydroponic temperature control apparatuses, air-driven climate control apparatuses (e.g., vents or other air inlet/outlet structures), and/or other climate control apparatuses or combinations of apparatuses. In the illustrated example, one or more water or other liquid conduits 30 can be fluidly connected to the climate control apparatus 26. The conduits (e.g., pipes, hoses, channels, or other pathways) 30 can include at least one of a chilled water return, a chilled water supply, a hot water return, a hot water supply, a refrigerant return, and/or a refrigerant supply. One or multi-way valves 34 can be positioned in all or a subset of the fluid lines between the conduits 30 and the climate control apparatus 26. The climate control apparatus 26 and/or valves 34 can be controlled remotely via wireless signals. In some embodiments, a building control network controls one or more of the components of the applicant hub 10, either wirelessly or via a wired connection. In some embodiments, the climate control apparatus 26 and/or valves 34 are driven by a controller via a wired connection. The valves 34 can be driven by an analog control (e.g., a control capable of infinite and/or incremental variability) to precisely control fluid flow through the fluid pathways between the climate control apparatus 26 and the conduits 30. In some embodiments, the substrate 14 includes a plurality of climate control apparatuses 26. In some embodiments, dedicated outdoor air system ducking 38 can be connected to the one or more climate control apparatuses 26.

In some embodiments, the appliance hub 10 includes one or more fire suppression apparatuses 42. The fire suppression apparatuses 42 can be, for example, water sprinklers, foam (e.g., aqueous film-forming foam, film-forming fluoro protein, compressed air foam, and/or some combination thereof) emitters, powder (e.g., sodium bicarbonate, monoammonium phosphate, potassium bicarbonate, potassium chloride, and/or some combination thereof) emitters. In the illustrated embodiment, the fire suppression apparatuses 42 are connected to fluid line 46. The fluid line 46 can be, for example, a fire branch line or other water line. In some embodiments, one or more valves 50 can be positioned in the fluid pathways between the fluid line 46 and the fire suppression apparatuses 42.

As illustrated, the substrate 14 can include pre-formed mounts for various optional add-on components. For example, a projector mount 54 can be formed on an upper or lower surface of the substrate 14. Other mounts (e.g., decorative cover mounts, additional lighting mounts, speaker mounts, and/or other mounts) can be positioned on various surfaces of the substrate 14. In some embodiments, the substrate 14 includes internal data and/or electrical power conduits connected to one or more of the pre-formed mounts to provide power and/or control to the add-on equipment.

The appliance hub 10 can be configured such that all of the necessary piping, ducking, and/or wiring (collectively "connection structures") for the various components of the appliance hub 10 are pre-engineered and connected to the various components on the substrate 14. In some configurations, a single connection interface can provide connection between the various connection structures of the appliance hub 10 with the corresponding connection structures in the core of the building in which the appliance hub 10 is installed. Pre-engineering or pre-assembling the connection structures on the substrate 14 can allow for "plug and play" connection between the appliance hub 10 and the building, greatly reducing the installation and maintenance costs as compared with a system in which each individual connection structure must be arranged and connected to each subsystem on site. In some applications, the appliance hubs 10 have a second interface configured to facilitate connection between connection structures of one appliance hub 10 with another appliance hub 10, thereby reducing or eliminating the need to connect each separate appliance hub 10 to the core of the building. In some embodiments, substrate 14 is seismic ally anchored, thereby eliminating the need to separately anchor each of the components and subsystems installed on the substrate 14. The appliance hubs described herein can be configured to operate agnostic of preexisting building control systems, allowing easy and fast deployment and integration of the appliance hubs.

Figure 2:
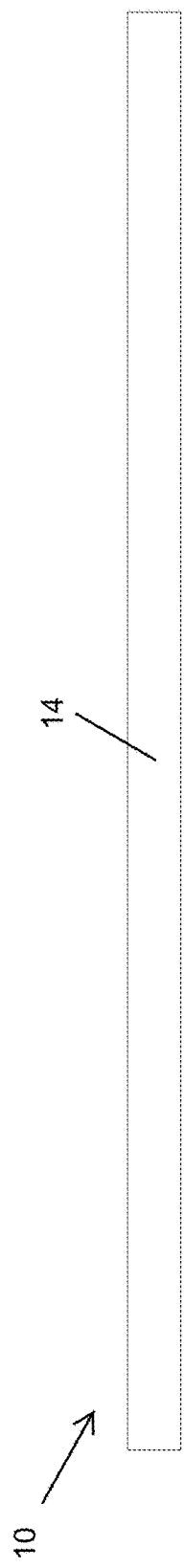
FIG. 2 is a cross-section taken along the cut plane A-A of FIG. 1, illustrating a first embodiment of a substrate.
Figure 3:
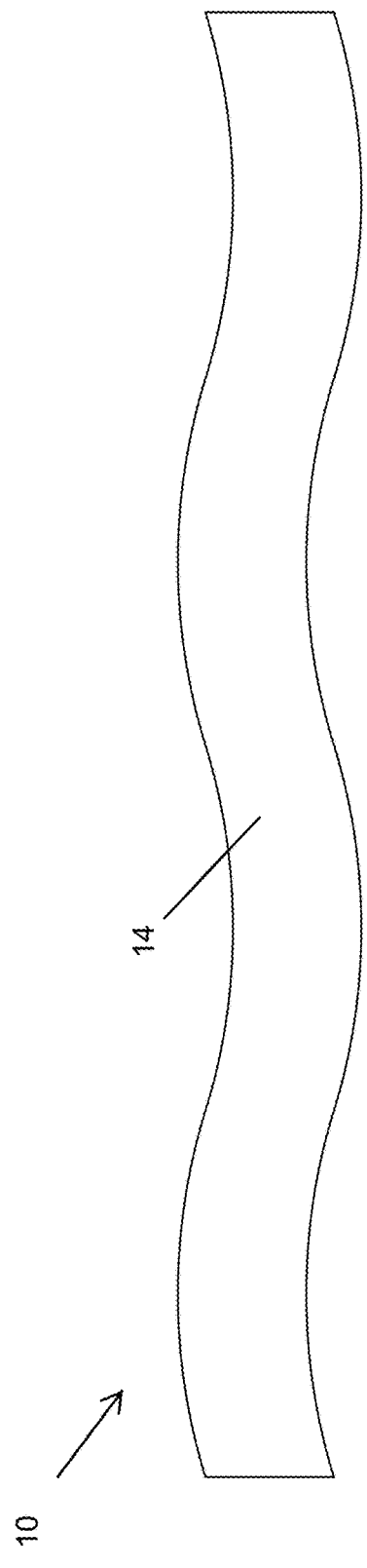
FIG. 3 is a cross-section taken along the cut plane A-A of FIG. 1, illustrating a second embodiment of a substrate.
Figure 4:
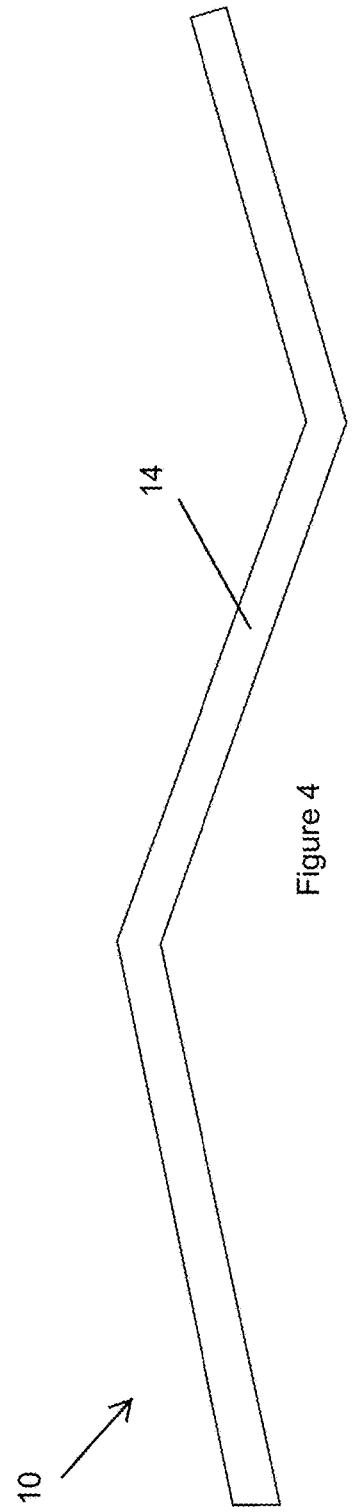
FIG. 4 is a cross-section taken along the cut plane A-A of FIG. 1, illustrating a third embodiment of a substrate.

As illustrated in FIGS. 2-4, the cross-sectional profile of the substrate 14 can take many shapes. For example, as illustrated in FIG. 2, all or a portion of the substrate 14 can be substantially flat. In some embodiments, the substrate 14, or some portion thereof, may have a wavy or curved shape, as illustrated in FIG. 3. In some embodiments, the substrate 14 may include one or more bends, as illustrated in FIG. 4.

Figure 5:
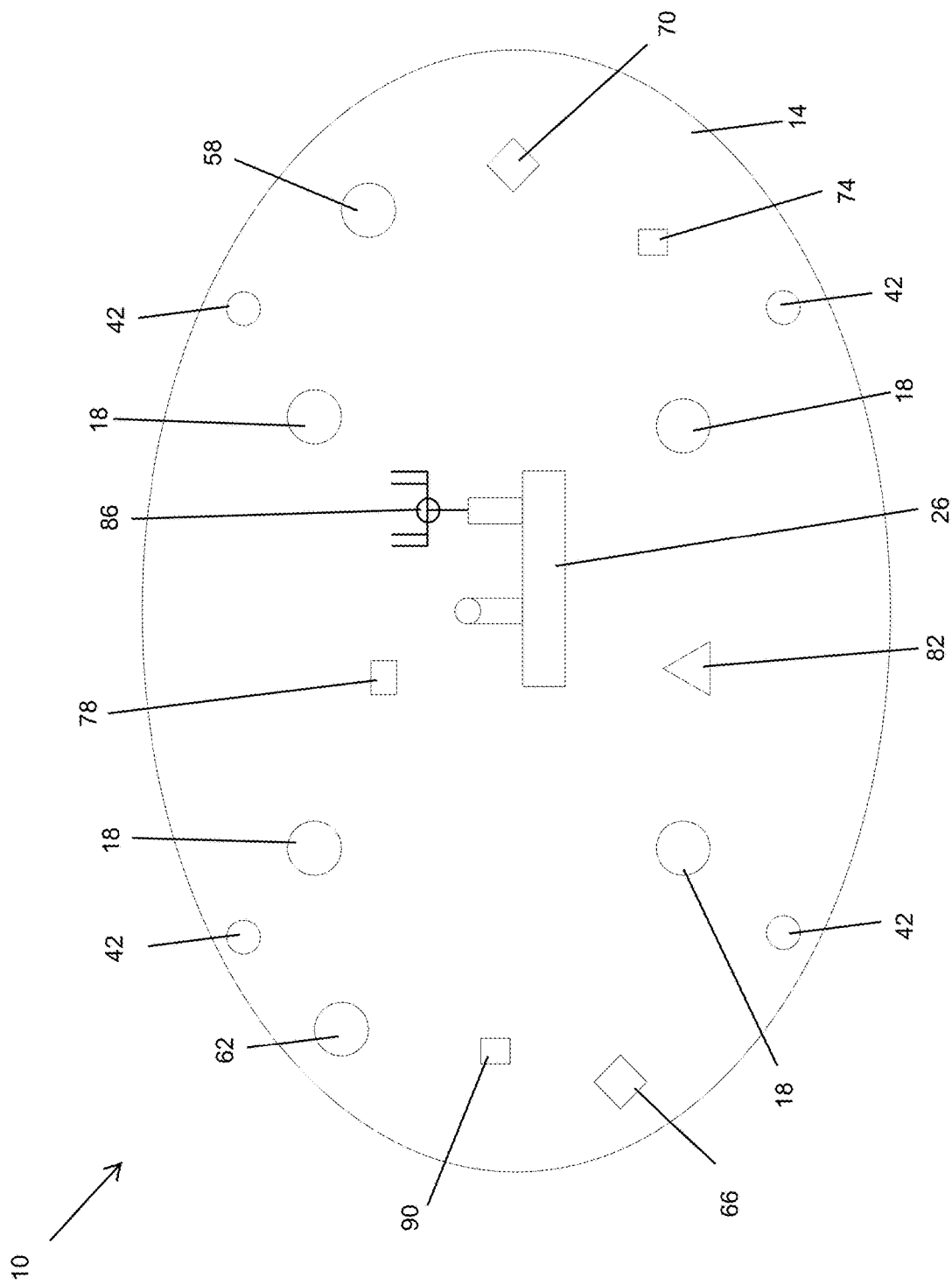
FIG. 5 is a schematic illustration of an appliance hub having various sensors.

The appliance hubs 10 can include a plurality of sensors, monitors, and/or other devices configured to evaluate various attributes of the enclosure in which the appliance hub 10 is installed. For example, as illustrated in FIG. 5, the appliance hub 10 can include one or more of a lighting sensor 58, occupancy sensor 62, sound level sensor 66 (e.g., a sensor attuned to sound level and/or to specific sounds such as gunshots or explosions), smoke/heat detector 70, indoor air quality ("IAQ") sensor 74, air flow sensor 78, room temperature sensor 82, a hot/chilled water flow sensor 86, and/or some other sensor or monitor (collectively, "sensors"). The functionality of any two or more of the sensors may be combined into a single physical sensor. All or some of the sensors can be mounted on or in the substrate 14 of the appliance hub 10. Preferably, one or more or all of the sensors are low voltage (e.g., 24V, 48V, 120V, or 220V).

In some applications, the IAQ sensor 74 can be configured to monitor various air quality indicators. These indicators can include carbon monoxide levels, carbon dioxide levels, volatile organic compound levels, radon levels, and/or some other air quality indicators. In some setups, data from the IAQ sensor 74 can act as a proxy for other characteristics of the enclosure. For example, carbon dioxide levels can be used to indicate approximate occupancy levels in the enclosure. Similarly, data from the room temperature sensor 82 can be used to indicate occupancy (e.g., the warmer the room, the more bodies within the room).

In some embodiments, the appliance hub 10 can be configured to be disassembled into multiple portions, and reassembled on-site. For example, the substrate 14 may be constructed in multiple portions, each of which is configured to releasbly mate with one or more other portions of the substrate 14. In some applications, all or most of the sensors and components of the appliance hub 10 are positioned/installed on a single portion of the substrate 14 (e.g., a central portion or a portion designed to be closest to the core of the installation site) and the remaining portions of the substrate 14 do not include sensors or other components. Configuring the hub 10 to be disassembled and reassembled can allow for installation of larger hub 10 than may otherwise fit in elevators, doorways, windows, or other installation pathways in a given installation site. Disassembling the hub 10 can also allow for easier and/or cheaper shipping of the hub 10 to the installation site. In some embodiments, utilizing disassemble/reassemble designs for the hub 10 can allow for uniform manufacturing of a single substrate 14 design for installation of the components and/or sensors, while the remaining portions of the substrate 14 can be customizable to the space and preferences at a given installation site.

The appliance hub 10 may include one or more data hubs 90. The data hubs 90 can be configured to communicate (e.g., bilaterally) with one or more of the sensors, lighting elements 18, fire suppression apparatuses 42, climate control apparatus(es) 26, and/or other components of the appliance hub 10 (collectively, "components"). In some embodiments, one or more of the components includes a dedicated wireless data transmitter. In some embodiments, each of the components is connected to the data hub(s) 90 via a wired connection. The components and sensors of the appliance hub 10 can be tracked (e.g., physical location, operating status, power status, warranty information, service history, maintenance schedule, etc.) Via Bluetooth® beacons, IP device tracking, RID and/or other tracking protocols. In some embodiments, this tracking can be facilitated via one or more of the data hubs 90. In some embodiments, the tracking and other associated information is monitor able via a mobile application. The ability to track the locations and components of specific appliance hubs 10 can allow for easy exchange of one appliance hub 10 for another. For example, if a building owner, tenant, or other individual wishes to trade their appliance hub 10 for the appliance hub 10 of another individual (e.g., for aesthetic and/or functional reasons), the tracking of the appliance hub locations can allow for automatic accounting of the locations of the appliance hubs before and after moving. Tracking the locations of the individual appliance hubs 10 can also allow for simplified retrofit ting of existing structures. More specifically, because the characteristics of appliance hubs 10 can be monitored and associated with specific locations within a structure, the control algorithms and other control systems can be easily customized for wholistic management of the appliance hubs 10 within a given structure.

Figure 6A:
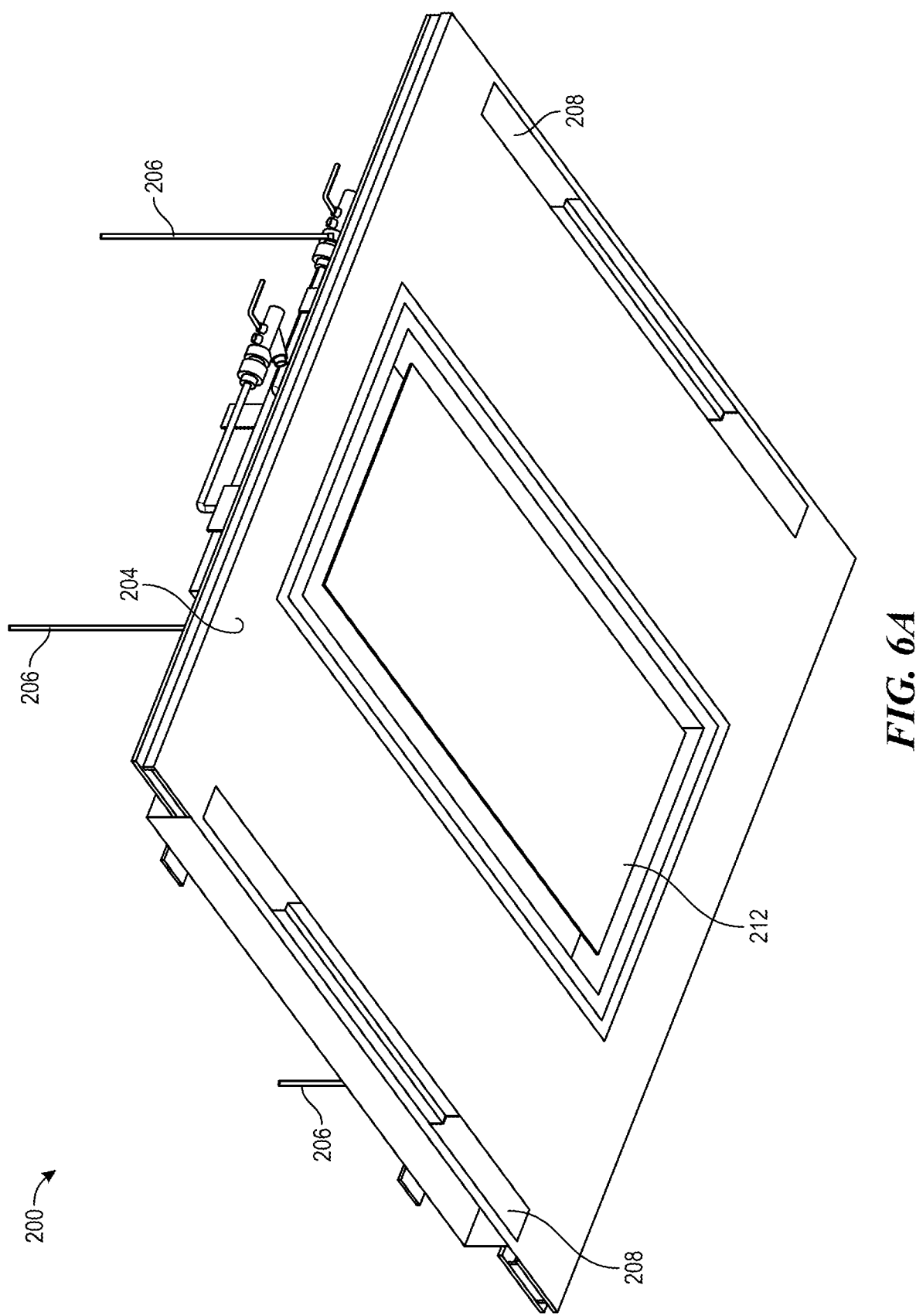
FIG. 6A is a lower perspective view of another embodiment of an appliance hub.

FIGS. 6A-6M illustrate an embodiment of an appliance hub 200 having many similar features to the appliance hub 10 described above. For example, the appliance hub 200 of FIG. 6A-6M can include one or more of the modules or the components of the appliance hubs 10 described above. As illustrated in FIG. 6A, the appliance hub 200 can include a substrate 204. The substrate 204 can be constructed in one or more layers. One or more modules can be mounted onto and/or into the substrate 204. The substrate 204 can be connected to a ceiling or other support structure via hangers 206 or other structural attachments.

The appliance hub 200 can include one or more lighting modules 208 and/or one or more climate modules 212. In the illustrated embodiment, the appliance hub 200 includes lighting modules 208 positioned at or near the perimeter of the substrate 204. In some embodiments, the lighting modules 208 are positioned at or near the center of the substrate 204 or at positions between the center and the perimeter of the substrate 204. The lighting modules 208 can include, for example, fluorescent lights, LED lights, incandescent lights, and/or some other combination of light sources. The lighting modules 208 can be constructed as replaceable (e.g., modular) units. For example, a lighting module 208 having LED lights may be exchangeable for module having fluorescent lights without modifying the structure of the substrate 204 or other portions of the appliance hub 200.

Figure 6B:
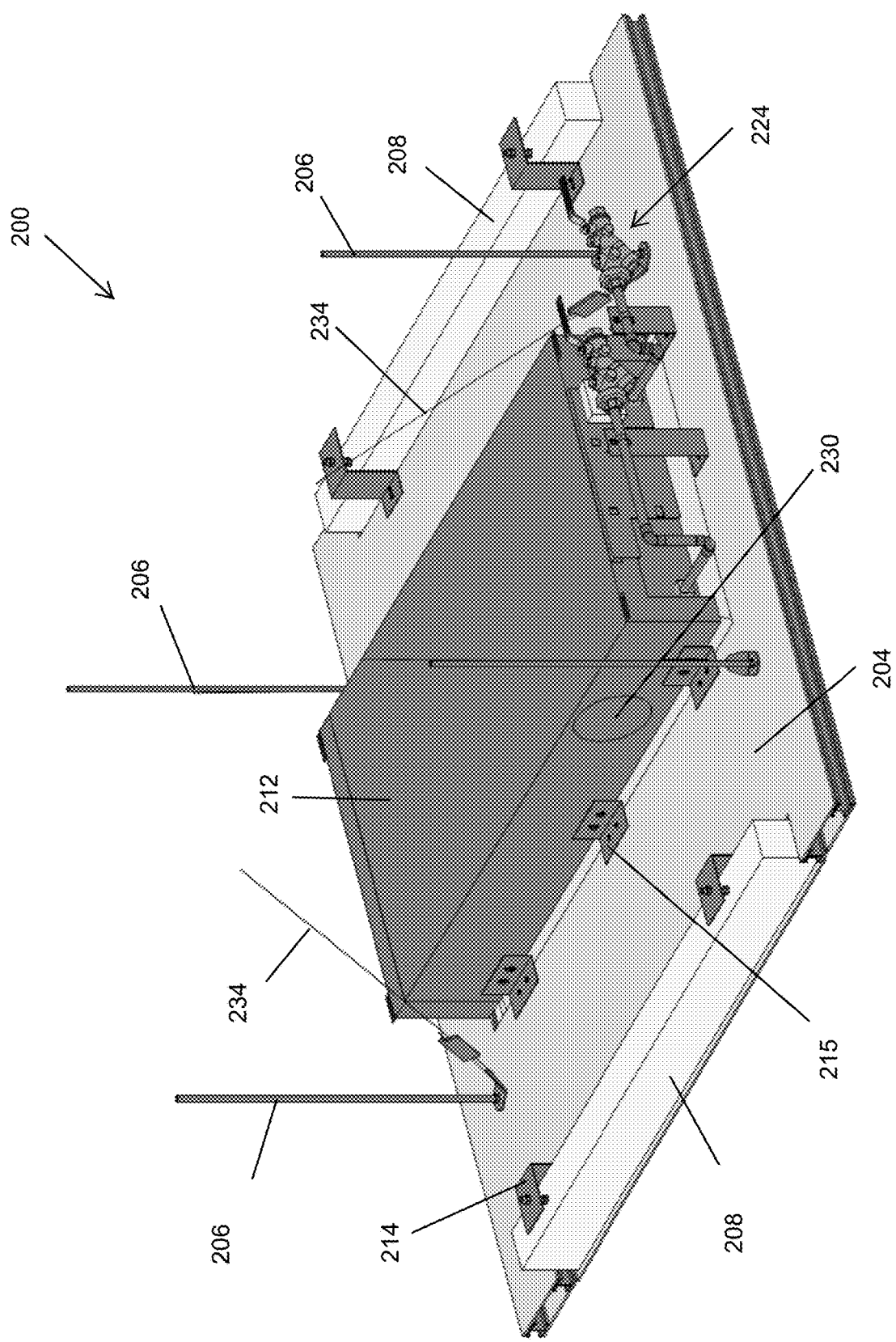
FIG. 6B is an upper perspective view of the appliance hub of FIG. 6A.

The one or more climate modules 212 can be distributed on the substrate 204 at various positions. For example, in the illustrated embodiment the climate module 212 is positioned at or near the center of the substrate 204. Referring to FIG. 6B, the lighting modules 208 and/or the climate modules 212 can be connected to the substrate 204 via one or more brackets 214, 215 or other attachment structures. In some embodiments, the substrate 204 includes one or more indentations, cavities, cutouts 216 (FIG. 6I), and/or other features configured to accommodate the lighting and/or climate modules 208, 212. As illustrated in FIG. 6G, the brackets 214 used to mountain the lighting modules 208 can have a height with respect to the substrate 204 that is greater than the lighting modules 208. This can facilitate adjustment of the vertical position of the lighting modules 208 with respect to the substrate 204. For example, the brackets 214 can be connected to the lighting modules 208 via a bolt 220 and an adjustable nut 222 configured to allow for vertical adjustment of the lighting module 208. This adjustment can allow the installer to, for example, align the lighting modules 208 with a bottom surface of the substrate 204 and/or the bottom surface of materials (e.g., acoustic and/or aesthetic materials) connected to the substrate 204. For example, vertical adjustment of the lighting modules 208 and/or of other components can also facilitate alignment of the components with acoustic materials or other materials attached to the substrate and having varying thicknesses. In some embodiments, vertical positioning of the lighting modules 208 can affect the aesthetic quality of the appliance hub 200 in various ways that may be desired in particular installations.

In some embodiments, the climate module 212 includes one or more of a chilled beam, an HVAC duct, a heated beam, and/or some other climate control device. As illustrated, the appliance hub 200 can include a valve system 224. The valve system 224 can include one or more valves configured to selectively control flow of fluid and/or gas to the climate module 212. For example, the valve system 224 can include a first valve 226a configured to control flow of hot water to the climate module 212 and a second valve 226b configured to control flow of cold water to the climate module 212. In some embodiments, the first valve 226a is an inlet valve configured to control flow of fluid (e.g., hot or cold fluid) into the climate module 212 in the second valve 226b is an outlet valve configured to control flow of fluid out from the climate module 212, or vice versa. As illustrated in FIG. 6G, the climate module 212 includes one or more pipes 228 connected to the one or more valves 226a, 226b. The pipes 228 can be configured to convey fluid to and/or from the climate module 212. In some embodiments, the pipes 228 and/or the valves 226a, 226b are mounted to the climate module 212 and/or to the substrate 204 via one or more brackets 229. The brackets 229 can have varying heights with respect to the top surface of the substrate 204 to accommodate varying positions for the valves 226a, 226b and/or the 228 pipes with respect to the substrate 204.

As illustrated in FIGS. 6B and 6D, the climate module 212 can include a ducking port 230 or other opening configured to mate with an HVAC duct or other duct (see FIG. 6F). HVAC ducking can be used in addition to or instead of a chilled or heated beam. In some embodiments, an elbow duct 232 or other portion of ducking is fixed and made part of the appliance hub 200. In some embodiments, the ducking port 230 includes a shroud, skirt, or other mating structure configured to facilitate connection of the climate module 212 to a centralized HVAC system.

As illustrated in FIG. 6B, the appliance hub 200 can include one or more hangers 206 or other structures configured to mount the appliance hub 200 at or near the ceiling of an enclosure. In the illustrated embodiment, the appliance hub 200 includes four hangers 206. In some embodiments, the appliance hub 200 can include two, three, four, five, six, or more hangers 206. In certain configurations, a single hanger 206 or the mounting structure can be used. Some such configurations, the single hanger 206 is mounted at or near the center of mass of the appliance hub 200. The hangers 206 can be configured to connect to the substrate 204 and/or to one or more modules of the appliance hub 200. In some embodiments, the hangers 206 or other structural supports provide a rigid connection to the ceiling or other structural portion of an enclosure. In some other embodiments, one or more of the hangers 206 or other structural supports provide a flexible and/or resilient connection to the ceiling or other structural portion of enclosure.

Figure 6C:
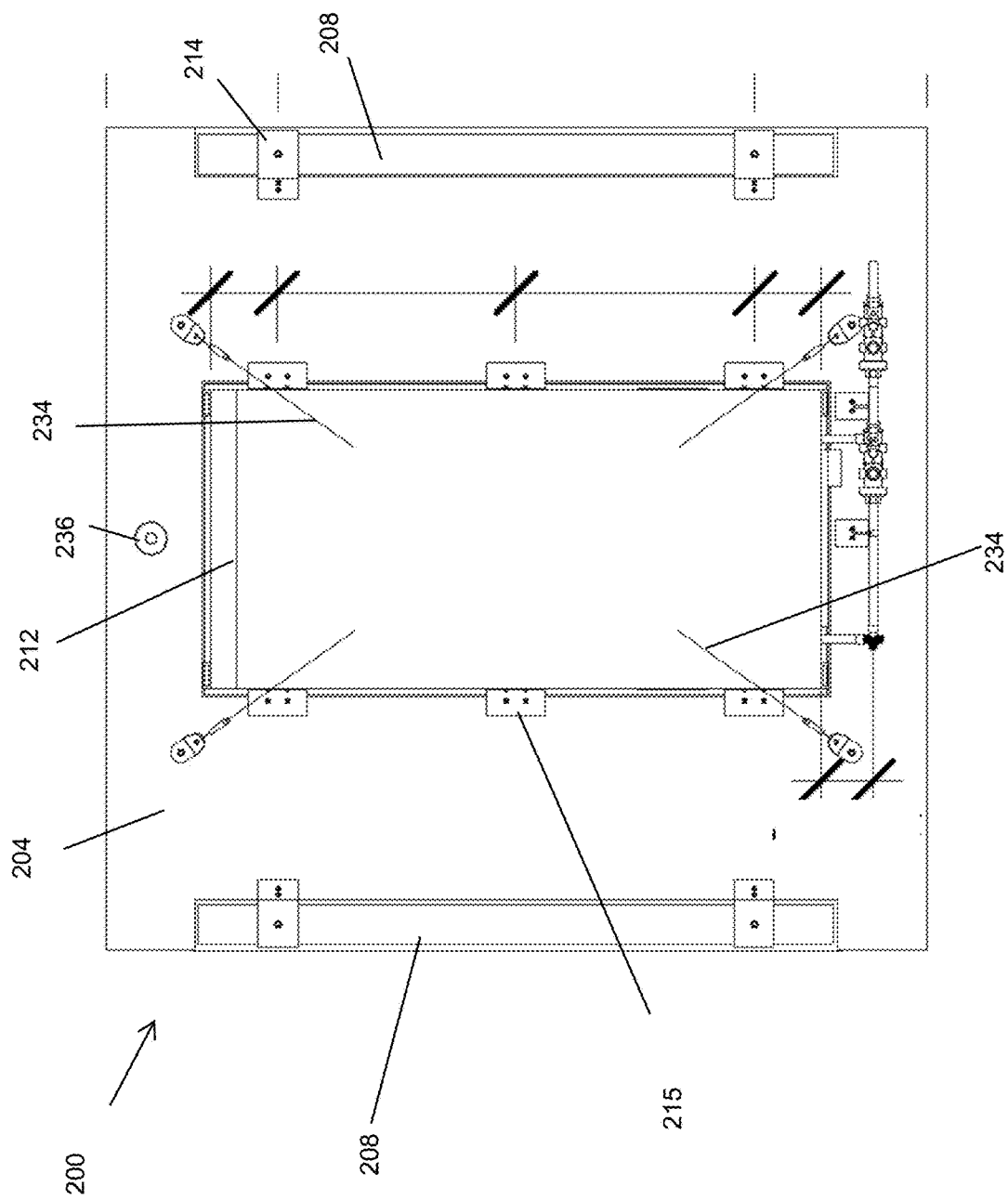
FIG. 6C is a top plan view of the appliance hub of FIG. 6A.
Figure 6G:
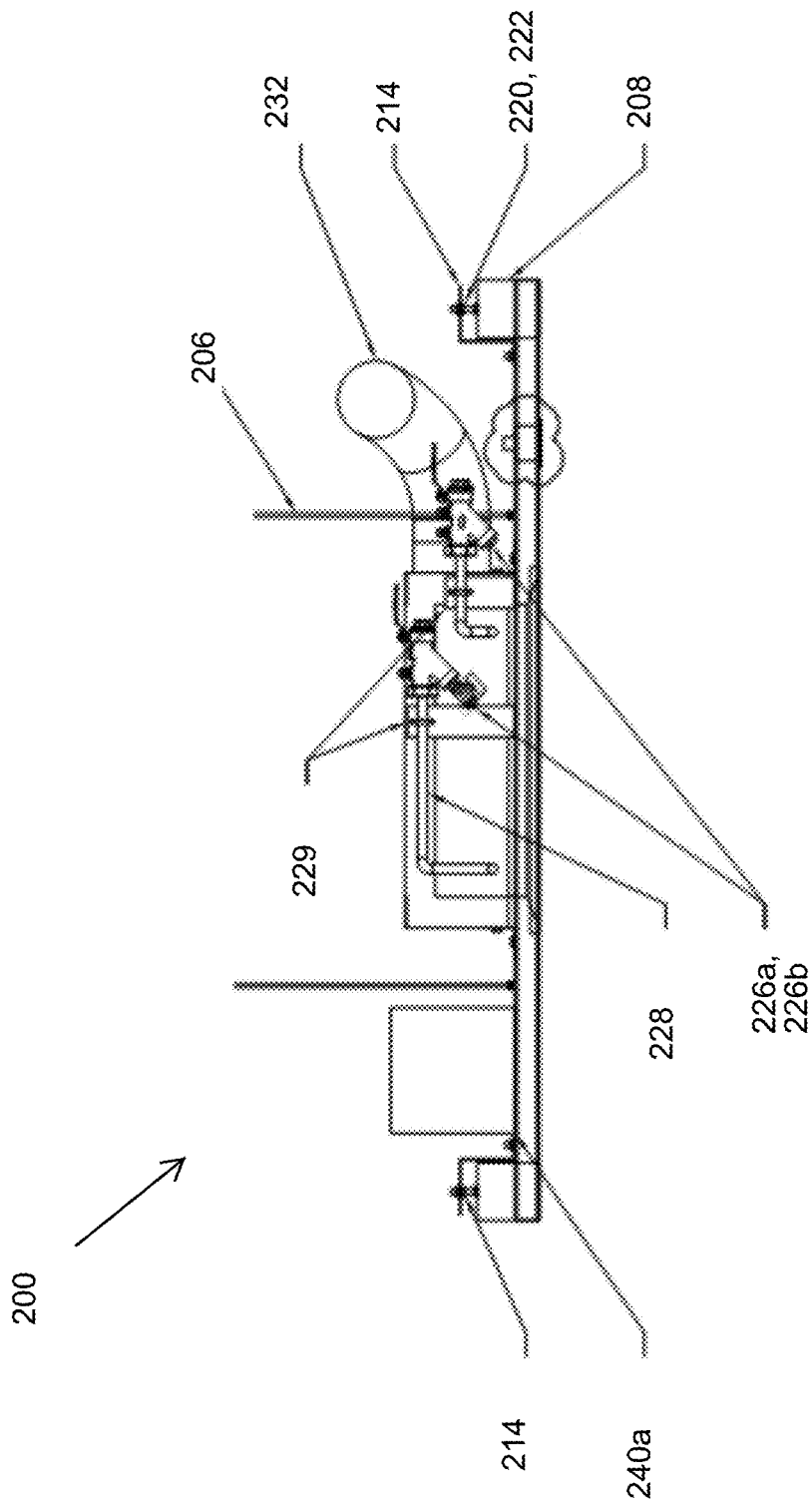
FIG. 6G is a front plan view of the appliance hub of FIG. 6A with an installed elbow duct and control panel.

As illustrated in FIGS. 6C-6E, the appliance hub 200 can include one or more seismic connectors. For example, one or more cables 234 can be connected to portions of the appliance. The cables 234 can be constructed from a flexible and/or resilient material. In some embodiments, the appliance hub 200 includes two or more cables 234, three or more cables 234, and/or four or more cables 234. The cables 234 or other seismic connectors can be configured to bear the weight of the appliance hub 200 in the event that one or more hangers 206 disconnect from the appliance hub 200, from the ceiling, and/or otherwise fail. In some embodiments, the cables 234 connect to the substrate 204 of the appliance hub 200. In some embodiments, one or more the cables 234 connect to one or more of the modules of the appliance hub 200.

As illustrated in FIG. 6D, the appliance hub 200 can include a sprinkler 236. The sprinkler 236 can be mounted in or on the substrate 204. In some embodiments, the appliance hub 200 includes more than one sprinkler 236. The sprinkler 236 can include one or more ports configured to connect to a hose or other conduit configured to carry water, foam, powder, and/or some other flame-retardant substance.

As illustrated in FIGS. 6F and 6G, the appliance hub 200 can include one or more control panels. For example, the appliance hub 200 can include a control panel 240a configured to facilitate control of the lighting modules 208 and a control panel 240b configured to facilitate control of the climate module 212 and/or other components of the appliance hub 200. In some embodiments, the appliance hub 200 includes a single control panel configured to control some or ail of the components of the appliance hub 200. The control panels 240a, 240b can be positioned on a top side of the substrate 204 on a lateral side of the substrate 204 and/or on a bottom side of substrate 204. In some embodiments, one or more of the control panels 240a, 240b are positioned on or in a module of the appliance hub 200.

Figure 6H:
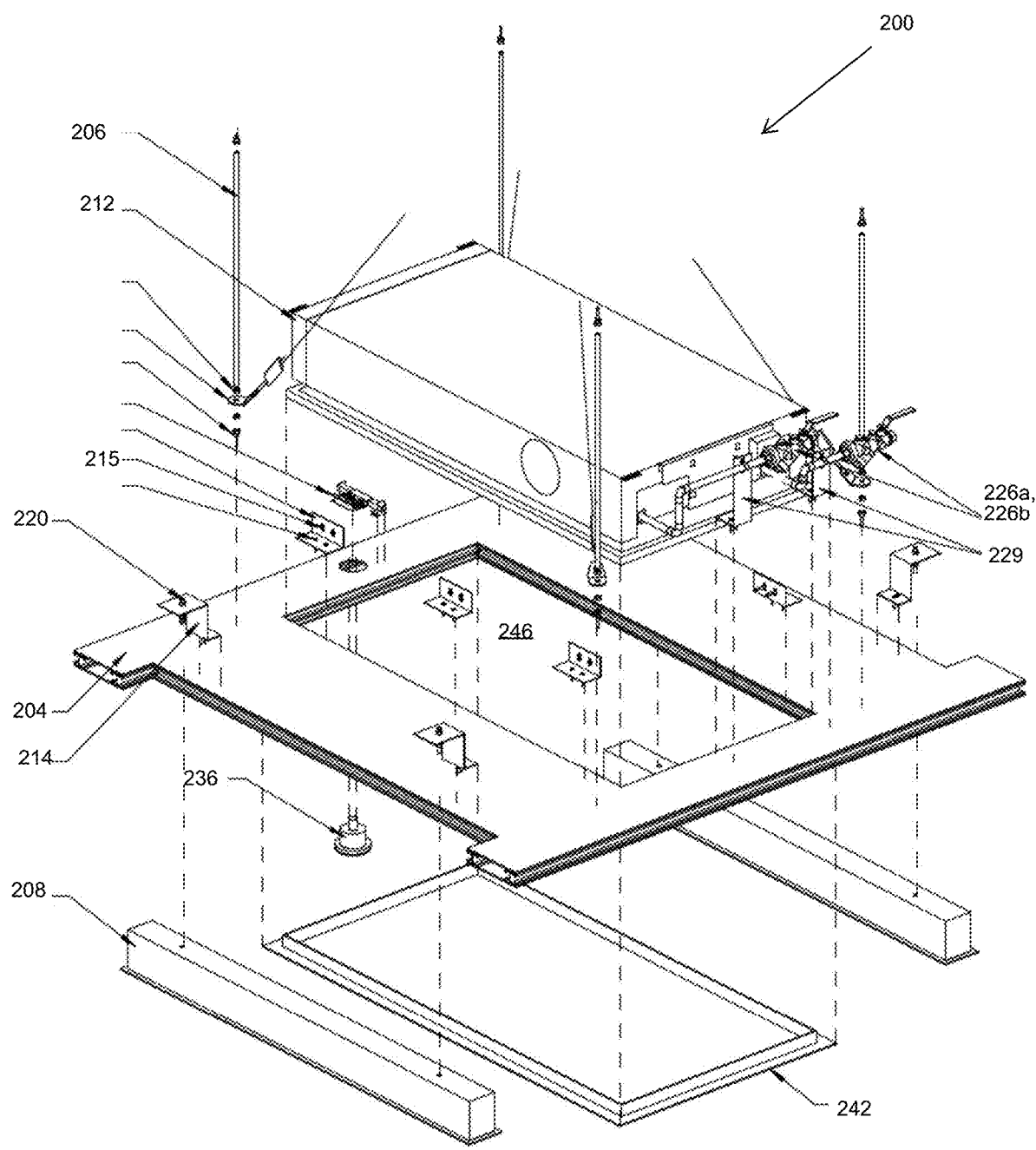
FIG. 6H is an exploded view of the appliance hub of FIG. 6A.

FIGS. 6H-6N illustrate the appliance hub 200 in various states of disassembly. As illustrated in FIG. 6H and discussed above, the lighting modules 208 can be connected to the substrate 204 or to some other portion of the appliance hub 200 via one or more brackets 214. Similarly, the climate module 212 can be connected to the substrate 204 via one or more brackets 215. In some embodiments, one or more of the modules are connected to the substrate 204 or to each other the other mechanical fittings, magnets, or other means of connection. In some embodiment, the climate module 212 can be further secured to the substrate 204 via use of a cover 242 and/or undercount connected to the substrate 204 and/or to the climate module 212.

In some embodiments, the hangers 206 and cables 234 share common brackets 246 connected to the substrate 204 or to some other portion of the appliance hub 200. The position of the brackets 246 for the hangers 206 and/or cables 234 on the substrate 204 can be determined by the position of the attachment points to the ceiling or other structural component of the enclosure in which the appliance hub 200 is to be installed. The valves 226a, 226b and associated pipes 228 of the climate module 212, as described above, can be connected to the substrate 204 via one or more brackets 229.

Figure 6I:
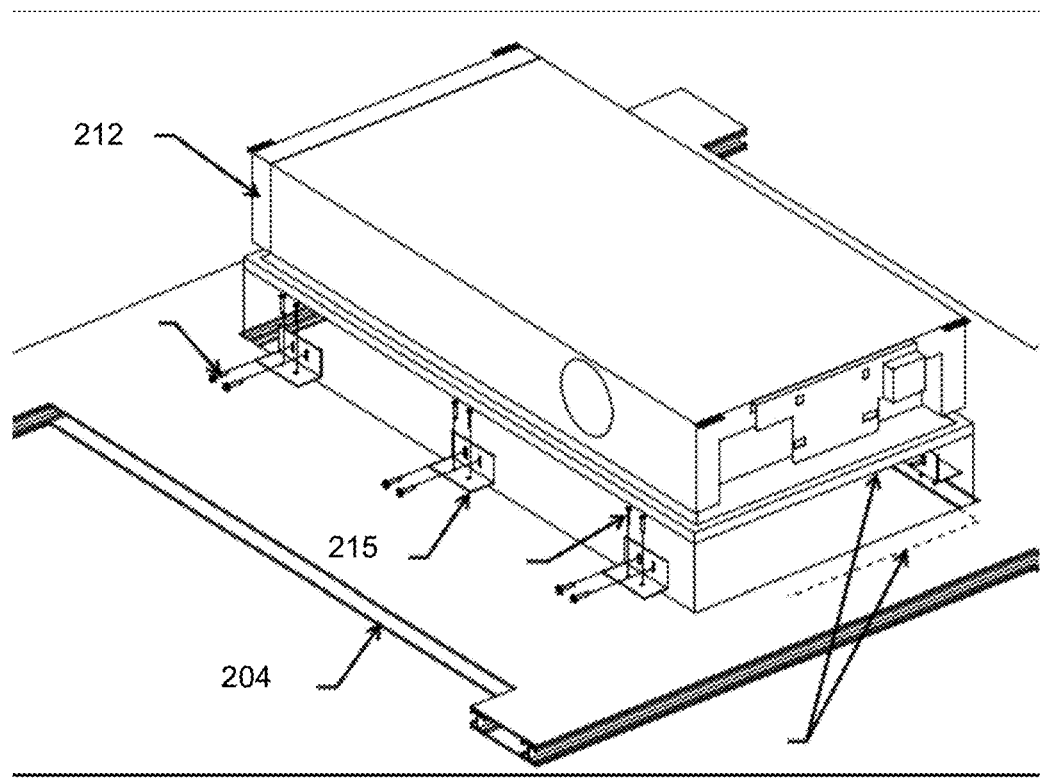
FIG. 6I is a partially-exploded view of the appliance hub of FIG. 6A wherein the climate module is disconnected from the substrate.

As illustrated in FIG. 6I, the climate module 212 can be connected to the substrate 204 via the brackets 215. Before fixing the brackets 215 to the substrate 204, the climate module 212 can be inserted into an opening 246 (FIG. 6H) in the substrate 204 sized and shaped to receive the climate module 212. Some embodiments, a bottom edge of the climate module 212 is aligned with the bottom surface of the substrate 204 before securing the brackets 215 to the climate module 212 and/or to the substrate 204.

Figure 6J:
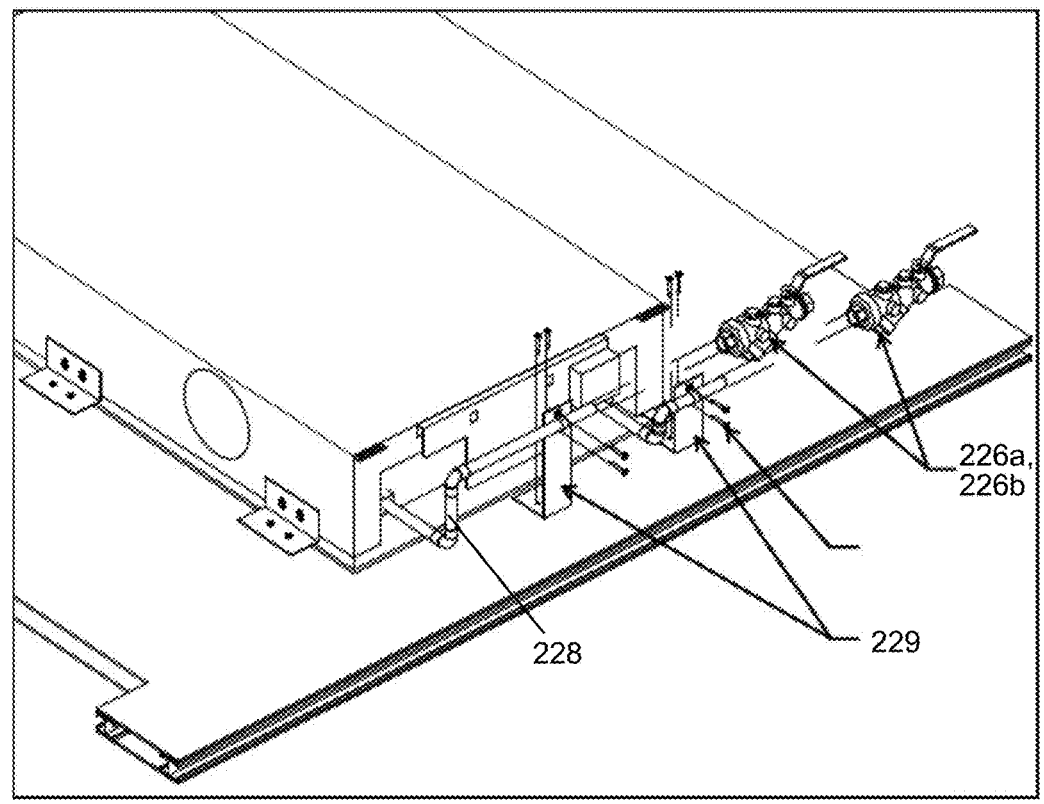
FIG. 6J is a partially-exploded view of the appliance hub of FIG. 6A wherein the valves are disconnected from the pipes of the climate module.

As illustrated in FIG. 6J, the pipes 228 for the climate module 212 can be connected to the climate module 212. In some embodiments, the pipes 228 are connected to the climate module 212 prior to connecting the climate module 212 to the substrate 204. In some embodiments, the pipes 228 are connected to the climate module 212 after connecting the climate module 212 to the substrate 204. The one or more valves 226a, 226b can be connected to the pipes 228 to control flow fluid into and out from the pipes 228. In some embodiments, the brackets 229 for supporting the pipes 228 are installed prior to connecting the valves 226a, 226b to the pipes 228.

Figure 6K:
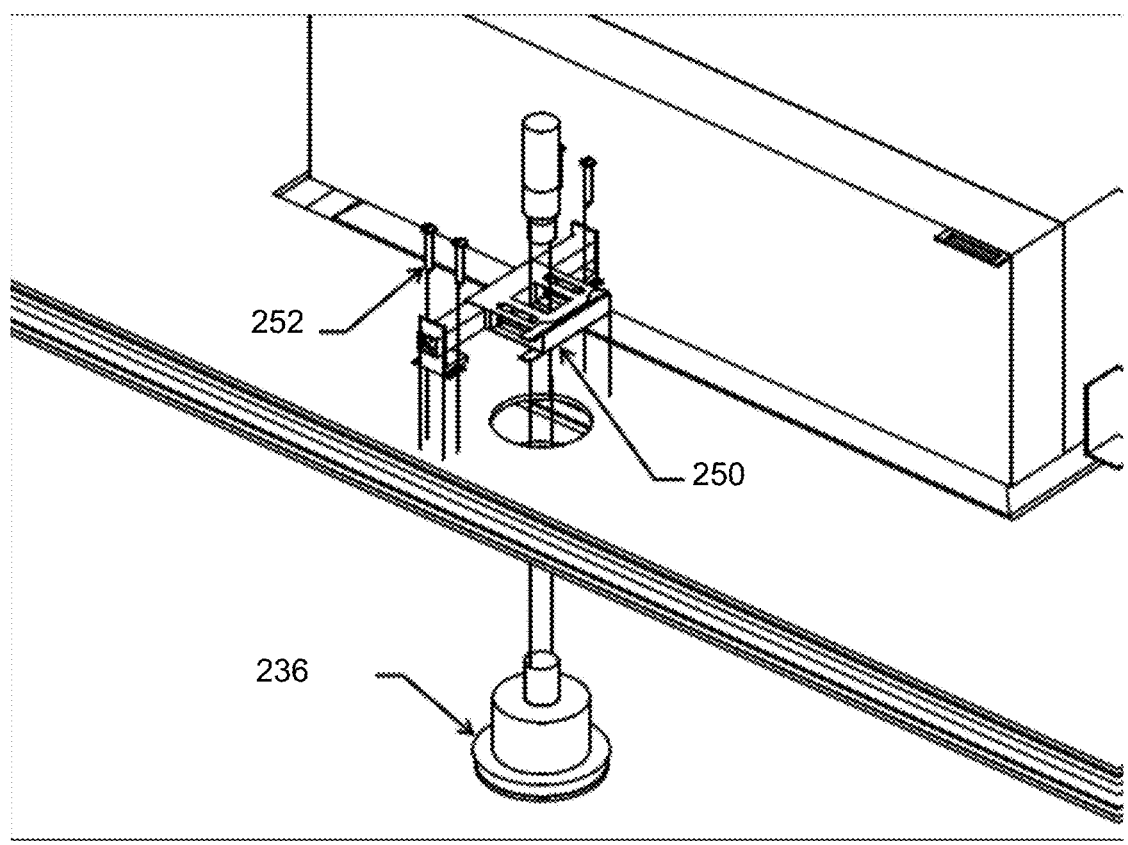
FIG. 6K is a partially-exploded view of the appliance hub of FIG. 6A wherein the sprinkler is disconnected from the substrate.

As illustrated in FIG. 6K, the sprinkler 236 can be connected to the substrate 204 or some other portion of the appliance hub 200. For example, the sprinkler 236 can be connected to the substrate 204 via one or more brackets 250 and one or more fasteners 252. In some embodiments, the substrate 204 includes an aperture, notch, indentation, or other feature configured to receive at least a portion of the sprinkler 236 when installed.

Figure 6L:
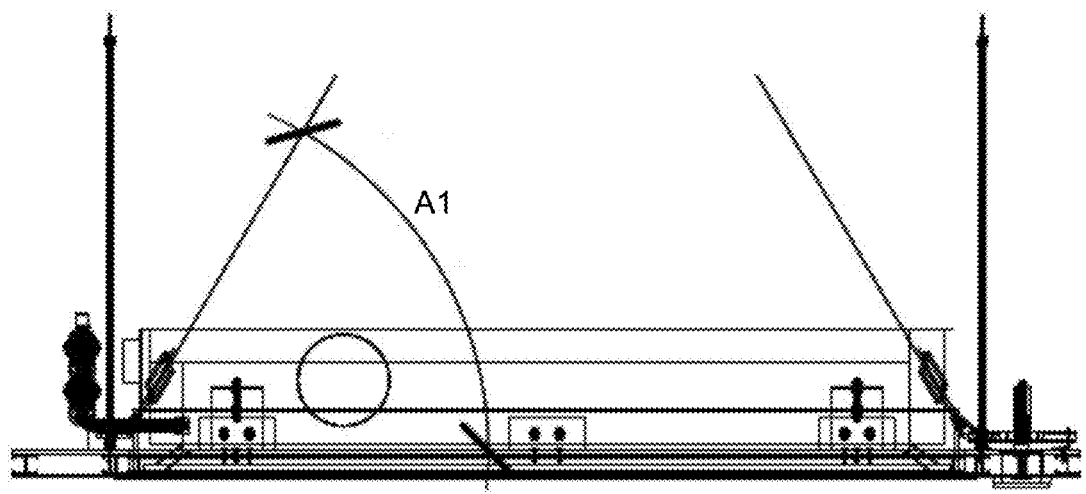
FIG. 6L is a right side plan view of the appliance hub of FIG. 6A.
Figure 6M:
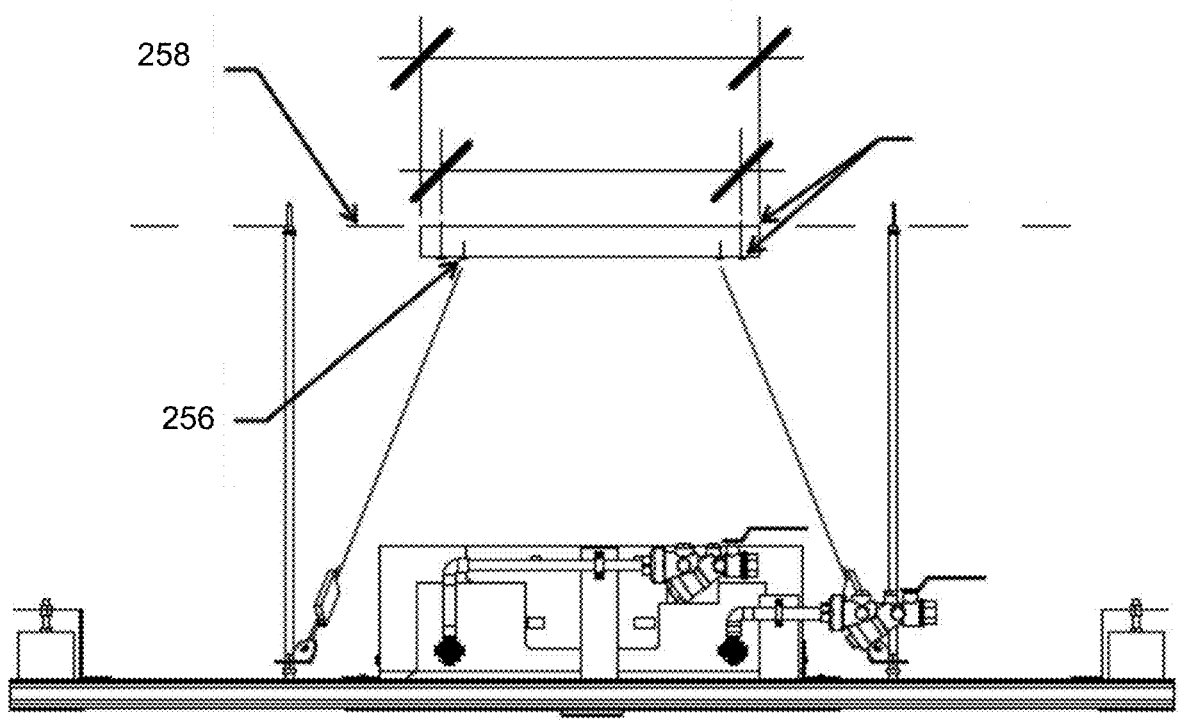
FIG. 6M is a front plan view of the appliance hub of FIG. 6A connected to a ceiling.

As illustrated in FIG. 6L, the seismic connectors (e.g., cables 234) can be oriented at an angle A1 with respect to the plane of the substrate 204 when installed. The cable angle A1 can be between for example 30° to 60°. Preferably, the cables 234 are mounted to portion of the ceiling separate from the portion of the ceiling to which the hangers 206 are mounted. For example, the cables 234 can be mounted to a seismic strut 256 or other structure separately installed on the ceiling 258. In some embodiment, the length of the hangers 206 and or cables 234 can be modified to facilitate installing the appliance hub 200 such that the substrate 204 is not parallel to the floor and/or to the ceiling of the enclosure in which the appliance hub 200 is installed.

Figure 7:
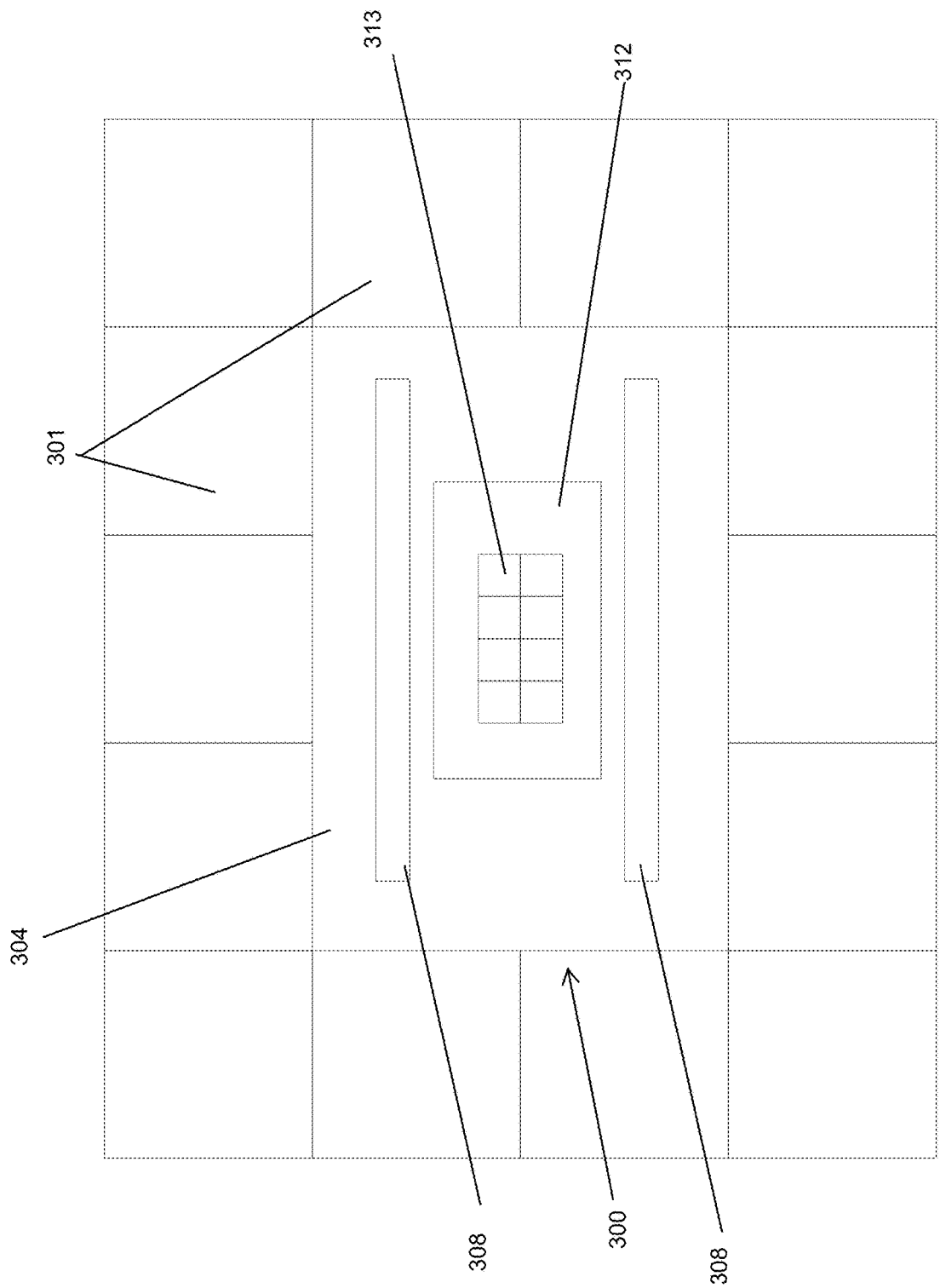
FIG. 7 is a schematic view of an appliance hub installed in an acoustic ceiling.

FIG. 7 illustrates an embodiment of an appliance hub 300 configured to be installed in a drop ceiling (e.g., an acoustic tile ceiling). As illustrated, the appliance hub 300 can be positioned between tiles 301 of pre-existing ceiling. A vertical position of the appliance hub 300 can be adjusted such that the appliance hub 300 is positioned flush with one or more of the surrounding tiles 301. In some embodiments, the appliance hub 300 installed first and the acoustic tile grid is built around the appliance hub 300. The appliance hub 300 can include one or more lighting modules 308, climate modules 312, and/or other modules 313 configured to improve an interior space.

Figure 8:
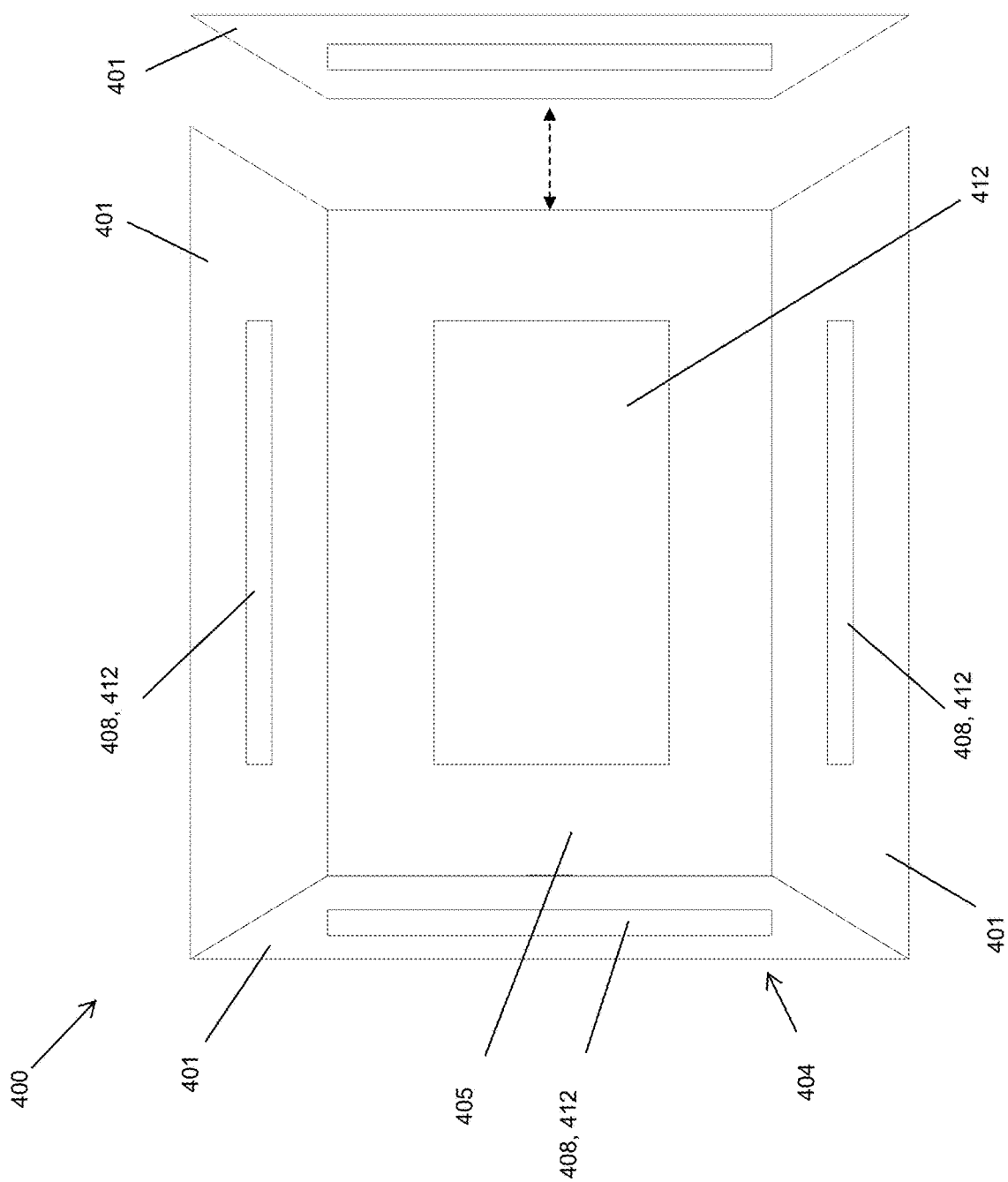
FIG. 8 is a schematic view of an appliance hub having removable wings.

As illustrated in FIG. 8, an embodiment of an appliance hub 400 can include one or more removable and/or replaceable substrate portions 401. These replaceable substrate portions 401 can be wings, panels, corners, strips, and/or other portions of the substrate 204. One or more of the removable/replaceable portions 401 of the substrate 404 can include one or more lighting modules 408, climate modules 412, and/or other functional features. In some embodiments, substrate portions 401 having modules of different types can be exchanged as desired. Replaceable substrate portions 401 can interface with each other and/or with a primary substrate portion 405 via shiplap, tongue and groove, detent, and/or other interface features. In some embodiments, the removable and/or replaceable portions 401 of the substrate 404 include fluid and/or electrical plugs or ports configured to facilitate electrical and/or fluid connection between the replaceable portions 401 of the substrate 404 in the primary portion 405 of the substrate 404. In some embodiments, the ports under plugs of the replaceable portions 401 of the substrate 404 are configured to facilitate electrical and/or fluid connection between the replaceable portion 401 of the substrate 404 and electricity/fluid sources of the building in which the appliance hub 400 is installed.

Figure 9:
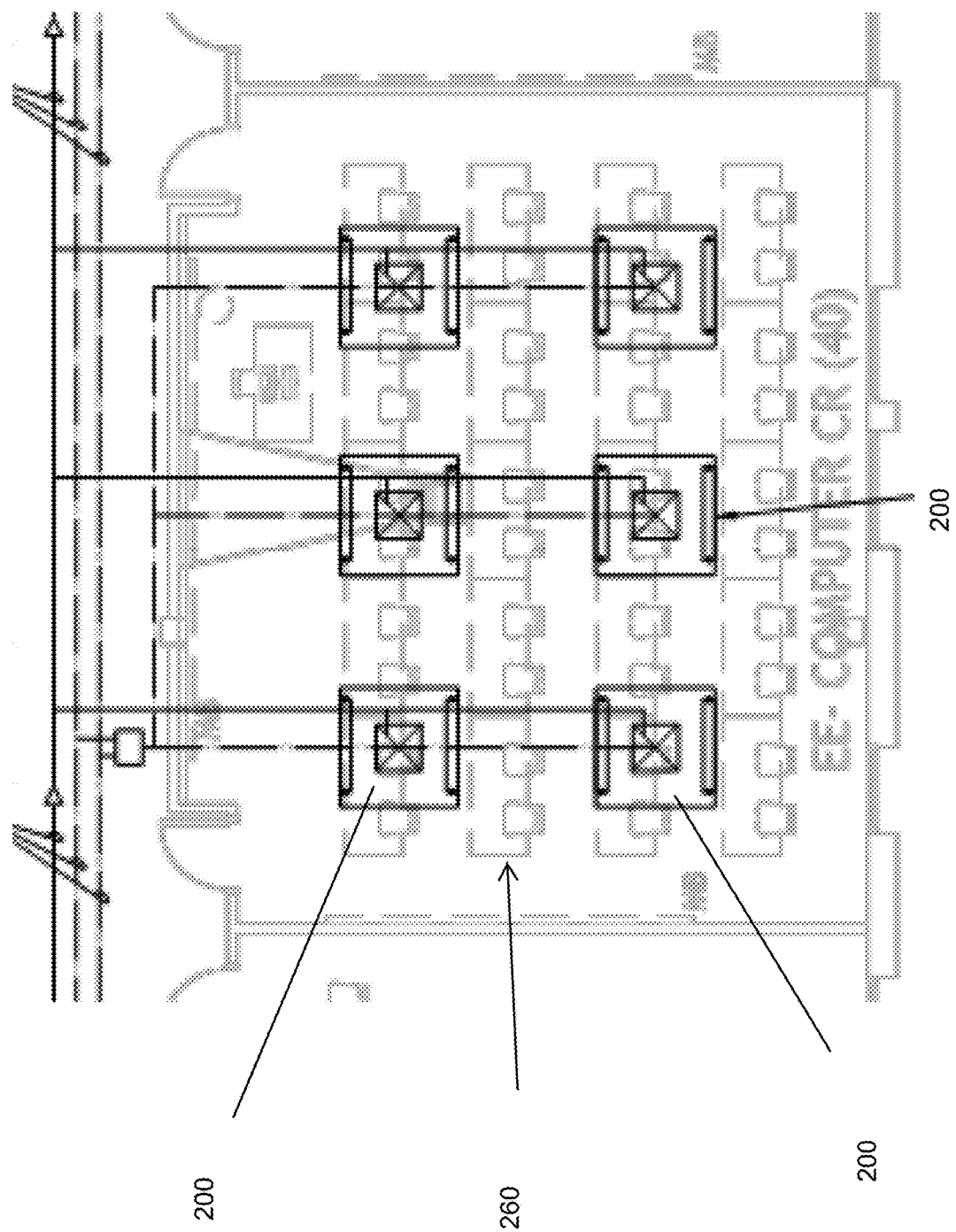
FIG. 9 is a top plan view of a plurality of appliance hubs installed in a room.

FIG. 9 illustrates a top down view of an enclosure in which a plurality of appliance hubs 200 are installed. For example, in the illustrated enclosure, several tables and seats 260 are arranged throughout the enclosure. The appliance hubs 200 can be installed in an array suitable to manage one or both of light distribution and climate control within the enclosure. The appliance hubs 200 can be installed with minimal or no structural modifications to the enclosure. For example, hangers 206, cables 234, and other mechanical connections can be affixed to already existing structural components within the enclosure. Wiring, ducking, and/or piping can be extended from the appliance hubs 200 to pre-existing HVAC, water, electrical systems of the building in which the appliance hubs 200 are installed. As illustrated, consolidation of components (e.g., lights, sensors, speakers, alarms, sprinklers, etc.) in one or more appliance hubs 200 can reduce the number of connection paths from the central utility lines to the hubs 200, as compared to a system where the lights, sensors, speakers, alarms, sprinklers, etc. are each installed separately.

FIGS. 10A-10B illustrate lateral plan views of two different appliance hub installations having varying vertical positions for the appliance hubs 200. Referring to FIG. 10A, in some embodiments, the appliance hubs 200 can be suspended downward from upper structure or deck 262 and/or be spaced from rib bays 264. Referring to FIG. 10B, in some embodiments, the appliance hubs 200 are installed at least partially within rib bays 264. Vertical positioning of the appliance hubs 200 can have downstream effects on positioning/distribution of certain components of the appliance hubs 200 and/or components separate from the appliance hubs. For example, in some such configurations wherein the appliance hubs are positioned in a lower vertical position, an installer may install a single sprinkler 266 in every other rib bay 264. In some such configurations wherein the appliance hubs 200 are positioned in a higher vertical position, it may be required that a sprinkler 266 be installed in every rib bay 264. In some applications, distribution of sprinklers 266 and/or other components are regulated by regulatory bodies (e.g., city, state, or other regulatory bodies).

As previously discussed, one or more electronic components (e.g., lighting elements, sensors, speakers, alarms, etc.) of the appliance hubs described herein can be configured to operate at a low voltage. For example, one or more or all of the electronic components can be configured to operate at 24V, 48V, 120V or at 220V. Using components that operate at low voltages can reduce or eliminate the need for a licensed electrician to install and/or operate the appliance hubs and can make installation of the appliance hubs safer than installation of other lighting fixtures standard in the industry. In some configurations, the appliance hubs can be reliably installed by individuals without specialized training. Reducing or eliminating the need for specialized technicians can reduce the cost of installing, moving, and/or otherwise handling the appliance hubs.

Figure 11:
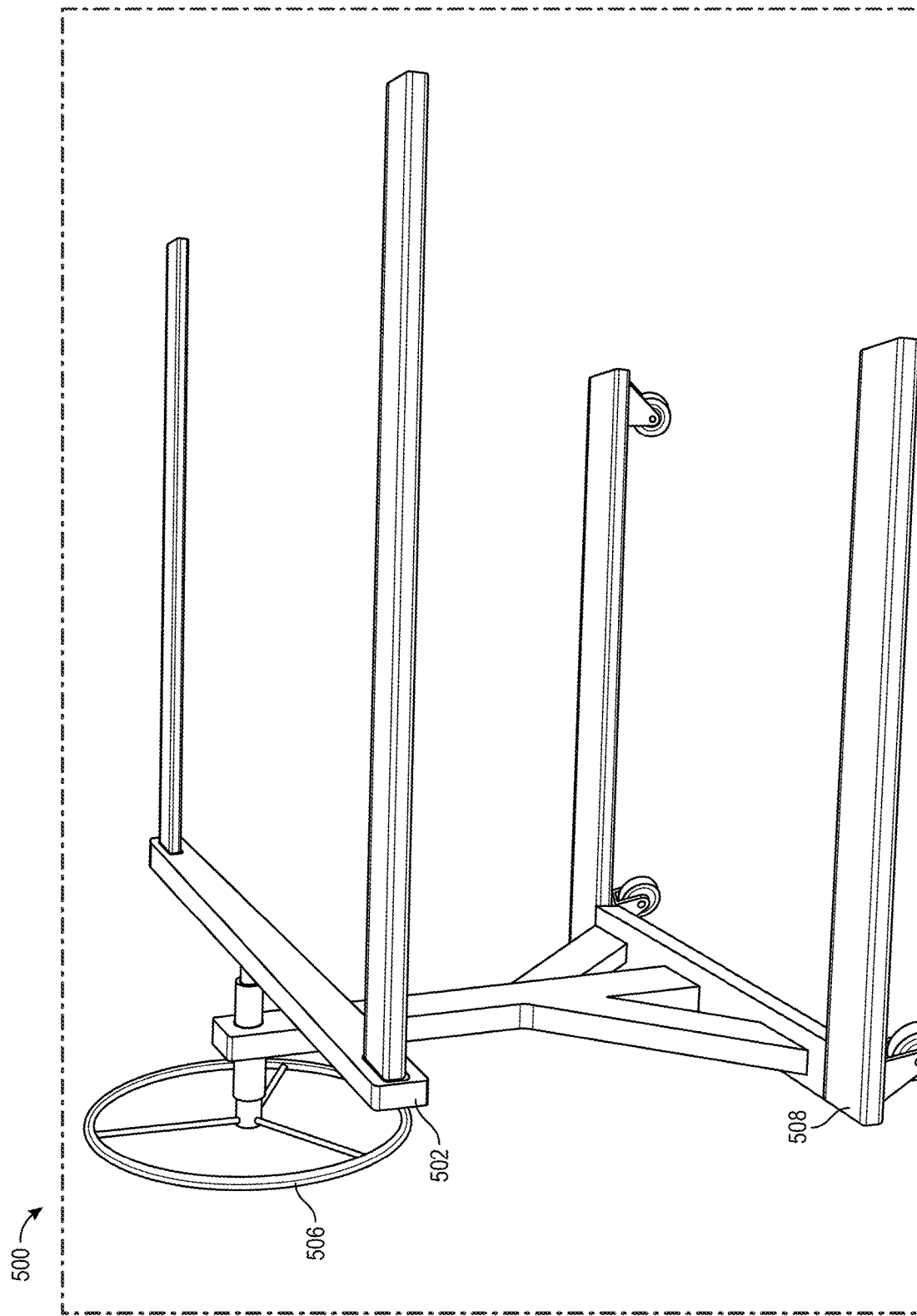
FIG. 11 is a perspective view of an assembly mechanism for assembling appliance hubs.

FIG. 11 illustrates an assembly mechanism 500 used to assemble the appliance hubs. As illustrated, the assembly mechanism 500 can include a substrate support 502. The substrate support 502 can have one or more arms configured to support the substrate of an appliance hub during assembly. In some embodiments, the assembly mechanism 500 can include a tilting mechanism 506 configured to tilt the substrate support 502 about one or more axes of rotation. For example, tilting mechanism 506 can be a wheel, arm, handle, or other mechanism. The assembly mechanism 500 can include a base 508. Preferably, the base 508 includes one or more wheels, casters, or other structures configured to allow the assembly mechanism 500 to be moved about. Utilizing an assembly mechanism 500 to assemble the appliance hubs can increase the ergonomics for the assemblers and can provide access to the top and/or bottom sides of the appliance hub with little or no restriction. Preferably, the appliance hubs include one or more handles (e.g., handles connected to the substrate or other portion of the appliance hub) configured to make it easier and safer to lift/maneuver the appliance hubs.

Figure 12:
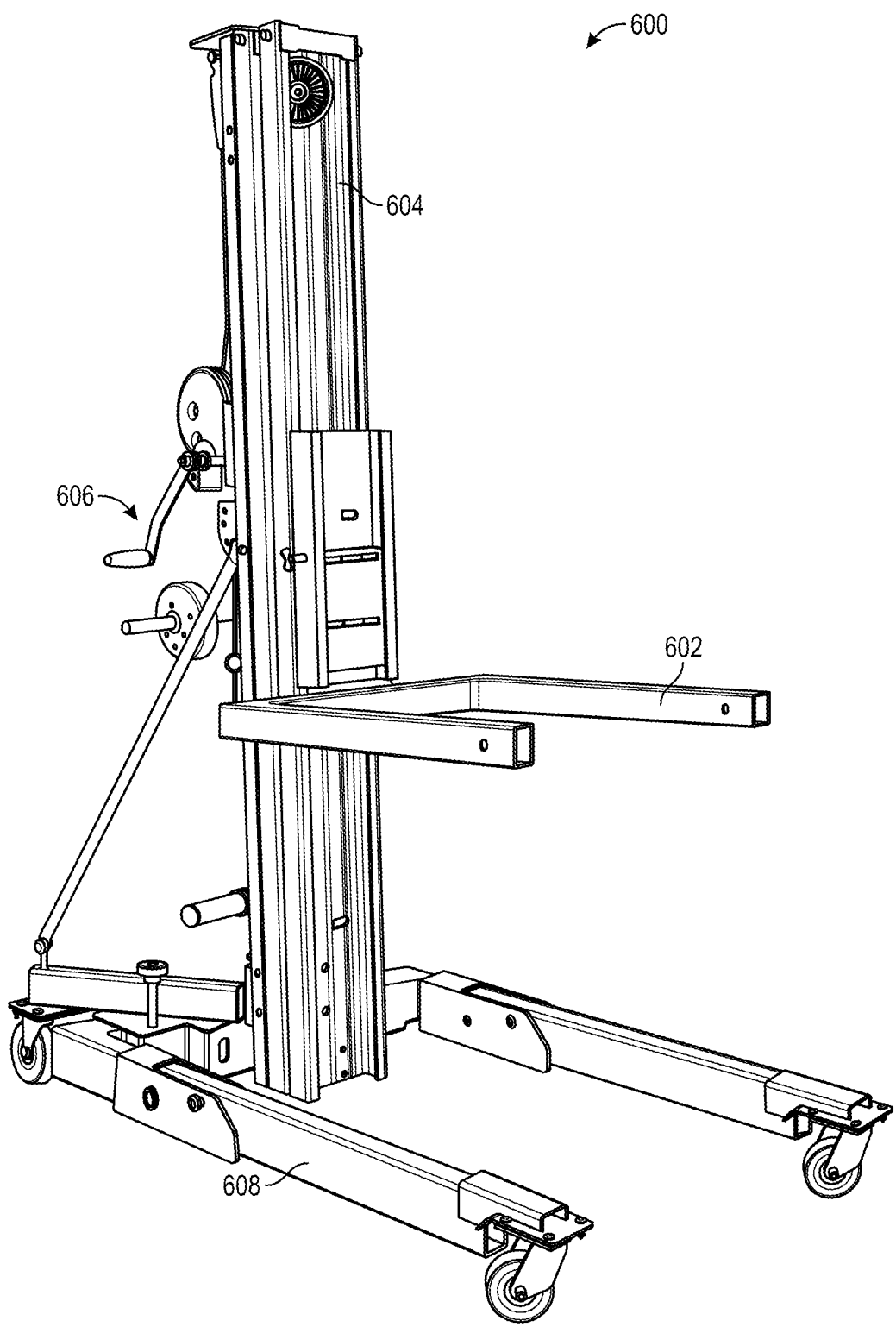
FIG. 12 is a perspective view of an installation mechanism for installing appliance hubs.

FIG. 12 illustrates an installation mechanism 600 (e.g., a lift) configured to enable appliance hubs to be lifted and installed in enclosures. The installation mechanism 600 can include an appliance hub support 602 having one or more arms, frames, or other support structures. The appliance hub support 602 can be mounted or otherwise connected to track and pulley system 604 or other system configured to move the appliance hub upward and downward. The installation mechanism 600 can include a base 608. The base 608 preferable includes wheels, casters, or other structure configured to allow movement of the installation mechanism 600 with little or no lifting. In some embodiments, the installation mechanism 600 includes a crank 606, wheel, lever, or other mechanism configured to move the appliance hub support 602 upward and downward along the track system 604. In some embodiments, movement of the appliance hub support 602 along the track system 604 is controlled electronically via a remote or other controller, either wirelessly or via a wired connection. In some embodiments, the installation mechanism 600 can be preprogrammed to automatically position an appliance hub in a desired position after the appliance hub is mated with the installation mechanism 600.

Figure 13:
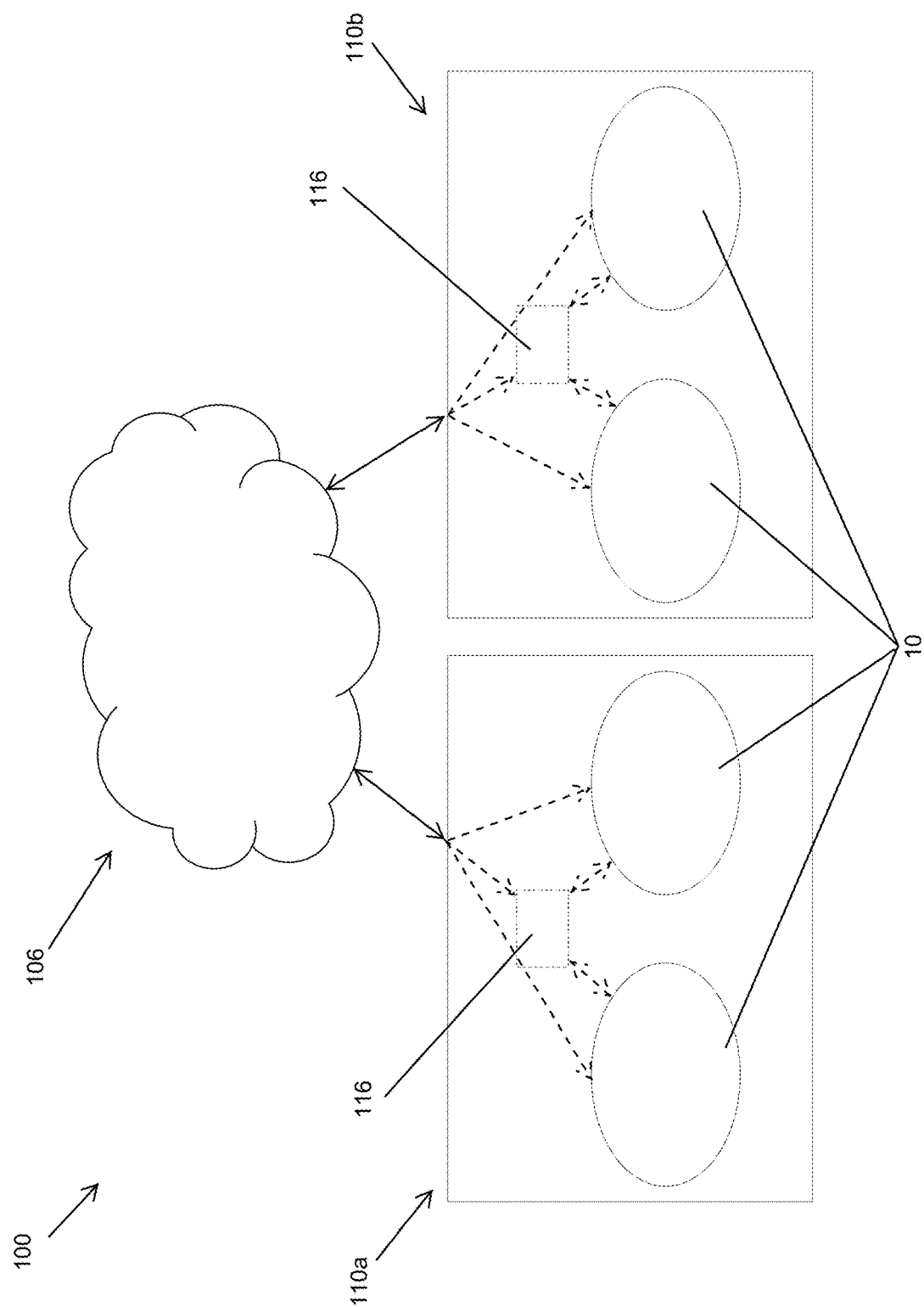
FIG. 13 is a schematic illustration of a system of appliance hubs and distributed network of servers.

As illustrated in FIG. 13, a plurality of appliances or appliance hubs 10 (or appliance hubs 200, 300, or 400) can be arranged in a network 100. The network 100 can include a network of distributed servers 106 (e.g., a "cloud network"). The cloud network 106 can be connected to one or more appliance hub groups 110a, 110b (collectively, 110). Each appliance hub group 110 can include one or more appliance hubs 10. In some embodiments, one or more of the appliance hub groups 110 includes a data hub 116 configured to relay data and control signals between the appliance hub groups 110 and the network of distributed servers 106. In some embodiments, appliance hubs 10 are arranged above and below each other to provide for additional measurement capabilities within an enclosure (e.g., indications of vertical distribution of data provided by the sensors).

The network of distributed servers 106 can be configured to collect and analyze data gathered from the various appliance hubs 10. This data can include data from the sensors on the substrates 14 of the appliance hubs, utility data (e.g., water and electricity use) from the structure(s) in which the appliance hubs 10 are installed, and/or feedback from users of the appliance hubs 10. The network of distributed servers 106 can be configured to provide control signals to the appliance hubs 10 to operate one or more of the components discussed above with respect to FIG. 1. In some embodiments, the network of distributed servers 106, or some other component or data hub can be configured to dispatch emergency services, dispatch repair services, or otherwise generate alerts when certain predetermined or learned parameters are detected by the sensors of the appliance hubs 10. The network 100 and/or individual appliance hubs 10 can be configured to track movement of persons into and out of enclosures. Tracking human movement can allow for adjustments to climate and other energy use parameters (e.g., more people in an enclosure can increase demand for air cooling).

Figure 14:
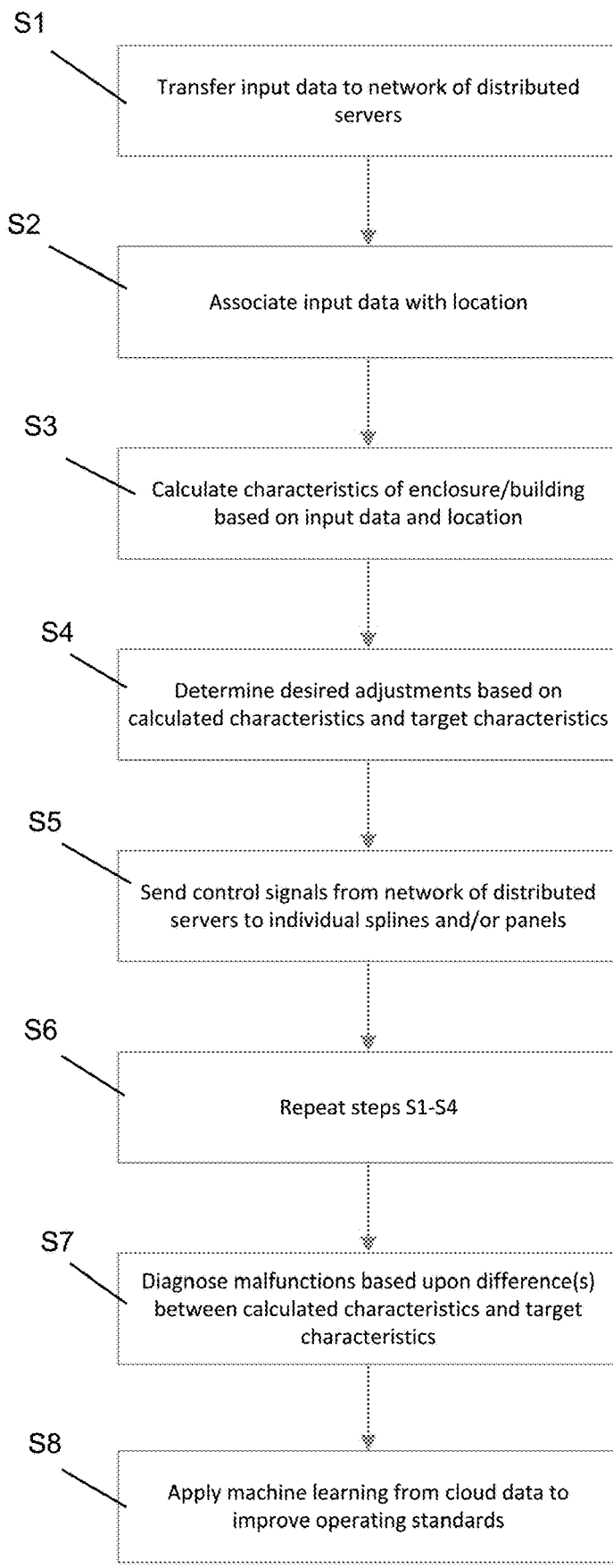
FIG. 14 is a flowchart illustrating a process which may be performed by a system of appliance hubs.

FIG. 14 illustrates a process of controlling the operation of appliance hubs 10 and their respective components and sensors. The first step S1 of the process may include transferring input data (e.g., sensor data, utility data, occupant input, maintenance input, etc.) from the various appliance hubs 10 and/or other sources to the network of distributed servers 106. The process can include the step S2 of associating the location data (e.g., address, building, floor, and/or room data) of the sensors or other inputs with the input data provided to the network of distributed servers 106. The network of distributed servers 106 can be configured, as reflected in step S3, to calculate various characteristics of the enclosure and/or building from the input data. These calculated characteristics can include occupancy, temperature distribution, air quality, overall comfort, and/or other characteristics. Based on the data from the sensors/inputs and/or the calculated characteristics of the enclosures, the network of distributed servers 106 can send control signals (S5) to the various components of the appliance hubs 10 to adjust the characteristics of the enclosure to desired values. These desired values (e.g., desired temperature, desired air quality, desired humidity, desired lighting levels, etc.) can be pre-established by a user of the system via a user interface (e.g., a mobile application, a voice command interface, PC, SMS text, or some other user interface). In some embodiments, the desired values can be informed by data from utility readings, occupant input (e.g., electronic calendars, recorded class or office schedules, badge-scanning in the building and/or at a parking structure, etc.). In some embodiments, a mobile application may be used to control one or more features of the appliance hubs 10 (e.g., either directly or via the network of distributed servers 106). The mobile application can be secured (e.g., via custom voice activation, encryption, password protection, biometric identification, and/or other security measures) to reduce the risk that control of the one or more appliance hubs 10 is unintentionally exposed to an unwanted user. In some embodiments, the control signals used to control the components (e.g., sensors, lighting elements, etc.) of the appliance hub(s) are generated automatically (e.g., without manual input) based on preset parameters (e.g., desired temperature, energy usage, etc.).

After the control signals are sent, steps S1-S4 of the process can be repeated (S6). The network of distributed servers 106 can be configured to diagnose malfunctions of or other undesirable outcomes generated by one or more components of one or more appliance hubs 10 based upon discrepancies between the desired values and the measured characteristics determined in the second iteration of step S4 (S7). For example, a higher temperature reading in the second iteration of step S4 may indicate a faulty climate control apparatus. This same discrepancy may, on the other hand, indicate that a door or window is opened. Upon detection of a discrepancy between the desired value and the measured characteristic, an alert may be sent to a designated user to evaluate whether one or more components of the appliance hubs 10 are faulty. This automated diagnosis regime can help users of the appliance hubs 10 and related networks 100 save significant maintenance costs. In some embodiments, the appliance hubs 10, networks 100, and/or cloud networks 106 can employ machine learning based on the sensor data, user input, and/or other parameters to improve overall efficiency or other operability parameters of appliance hubs 10. For example, machine learning can be used to evaluate relationships between operation of components of appliance hubs 10 and associated sensor measurements to reduce variance between intended outcomes (e.g., temperatures, lighting levels, air quality) and actual outcomes associated with operation of the appliance hubs 10 and associated components. Machine learning can also be used to monitor the habits of the inhabitants of the enclosures in which the appliance hubs 10 are installed. For example, the appliance hubs can be configured to monitor energy usage, personnel movement patterns, and other information which can then be conveyed to a user (e.g., a technician or other user) to suggest changes in automatic protocols (e.g., suggestions to shut off lights and/or climate control at earlier times, etc.).

Utilizing a network of appliance hubs 10 that are uniquely identified by location can allow for overall efficiency gains with respect to energy use, temperature optimization, maintenance management, and/or other parameters. For example, overall carbon production may be tracked using sensors in the various appliance hubs 10. Carbon production information can be used to facilitate carbon tax allocation and/or to allow for easier diagnosis of increased carbon emissions. The appliance hubs 10, via the network 100 components, can be coordinated together to provide a holistic energy plan for a given building, room, city, or other scale. The networks 100 can also increase the efficiency of monitoring energy use in order to reduce the costs associated with calculating utility bills.

In some embodiments, specific naming conventions can be established and associated with specific appliance hubs and components thereof. Use of specific/preset names or identifiers for the appliance hubs and components can allow for reliable and accurate tracking of the appliance hubs and components. Using consistent names/identifiers for like parts can also reduce complications during installation, repair, refurbishment, customization, replacement, and other operations conduct with or on the appliance hubs. Consistent naming/identifying of appliance hubs and components thereof can also improve machine learning associated with data detection and recordation from the appliance hubs and components thereof by improving the accuracy of assessments that can be made during analysis of the collected data (e.g., reliable attribution of location and type features of the data—such as temperature data from a specific room or location within a room).

It may be desirable for manufacturing, marketing, inventory, and other purposes to have preset appliance hub "models," wherein each model has a preset combination of components. The present combination of components for a given model can be configured for certain settings (e.g., classrooms, offices, hallways, conference rooms, cafeterias, warehouses, etc.). For example, a base model might include a hanging kit (e.g., hangers, fasteners, etc.) configured to facilitate physical installation of the appliance hub. The base model may include a substrate, lighting elements, unique identifier(s) QR code tag(s), Bluetooth® beacon(s), etc.), an acoustic material, and a light sensor. In some. embodiments, an "A" model may include, in addition to one or all of the base model features, a chilled beam, fluid hoses, fire/smoke alarm speaker and/or strobes, an AV speaker, and/or a WiFi access point. A "B" model may include, in addition to one or all of the features of the base model, an AV speaker, a fire/smoke alarm speaker and/or strobe, and/or a WiFi access point.

In some embodiments, combining multiple components and associated functions (e.g., lights, sensors, climate control modules. sprinklers, speakers, etc.) into a single appliance hub can streamline permitting for new construction or retrofit ting. For example, a single permit authority may be tasked with evaluating the appliance hub installations, rather than multiple permit authorities tasked with permitting the multiple different components.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. Moreover, the various embodiments described herein may also be combined to provide further embodiments. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment.

Certain aspects of the present technology may take the form of computer-executable instructions, including routines executed by a controller or other data processor. In some embodiments, a controller or other data processor is specifically programmed, configured, and/or constructed to perform one or more of these computer-executable instructions. Furthermore, some aspects of the present technology may take the form of data (e.g., non-transitory data) stored or distributed on computer-readable media, including magnetic or optically readable and/or removable computer discs as well as media distributed electronically over networks. Accordingly, data structures and transmissions of data particular to aspects of the present technology are encompassed within the scope of the present technology. The present technology also encompasses methods of both programming computer-readable media to perform particular steps and executing the steps.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms may also include the plural or singular term, respectively. Additionally, the term "comprising" is used throughout to mean including at least the recited feature(s) such that any greater number of the same feature and/or additional types of other features are not precluded. Directional terms, such as "upper," "lower," "front," "back," "vertical," and "horizontal," may be used herein to express and clarify the relationship between various elements. It should be understood that such terms do not denote absolute orientation. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. An appliance hub for use in an upper portion of an enclosure, the appliance hub comprising:
 a substrate configured to be positioned in an upper portion of an enclosure;
 a climate control apparatus mounted on the substrate, the climate control apparatus configured to regulate a temperature within the enclosure;
 one or more lighting elements configured to provide light within the enclosure;
 a plurality of fluid lines connected to the substrate and configured to provide fluid service and return to the climate control apparatus; and
 a plurality of electrical connections connected to the substrate and configured to provide electrical power and/or data to at least one of the climate control apparatus and the one or more lighting elements;
 wherein the substrate has a first face and a second face opposite the first face, wherein the first face faces away from the ground when the substrate is installed in an upper portion of an enclosure, and wherein the substrate has a polygonal cross section when observed from a direction normal to the second face.

2. The appliance hub of claim 1, wherein the substrate is substantially planar.

3. The appliance hub of claim 1, wherein the substrate comprises one or more waves or bends.

4. The appliance hub of claim 1, comprising a connection interface mounted on the substrate, the connection interface including a plurality of electrical, data, air, and/or fluid connection ports.

5. The appliance hub of claim 1, wherein the substrate comprises one or more conduits built into or onto the substrate, the one or more conduits configured to accommodate one or more fluid, air, electrical, and/or data connection structures.

6. The appliance hub of claim 1, further comprising a fire suppression apparatus and at least one valve mounted on or in the substrate and configured to control fluid flow to and from one or more of the climate control apparatus and the fire suppression apparatus.

7. The appliance hub of claim 1, further comprising a wireless signal generator connected to the substrate.

8. The appliance hub of claim 1, further comprising at least one of a sound level sensor, a motion sensor, an air quality monitor, a carbon dioxide sensor, a carbon monoxide sensor, a smoke detector, a light level sensor, a heat sensor, a room temperature sensor, a dewpoint sensor, and a humidity sensor.

9. The appliance hub of claim 1, wherein functionality of two or more of a sound level sensor, a motion sensor, an air quality monitor, a carbon dioxide sensor, a carbon monoxide sensor, a smoke detector, a light level sensor, a heat sensor, a room temperature sensor, a dewpoint sensor, and a humidity sensor are combined into a single sensor on the sound-absorbing substrate.

10. The appliance hub of claim 1, further comprising a sound-absorbing material mounted onto and/or into the substrate.

11. A climate control system comprising:
a plurality of the appliance hub of claim 1; and
a network of distributed servers hosted on the internet and configured to bilaterally communicate with the plurality of appliance hubs.

12. The climate control system of claim 11, further comprising at least one network hub configured to bilaterally communicate with one or both of the plurality of appliance hubs and the network of distributed servers.

13. The climate control system of claim 11, wherein the plurality of appliance hubs are configured to communicate at least one of the following items of information to one or both of the at least one network hub and the network of distributed servers:
temperature data;
air composition data, including one or more of carbon dioxide levels, carbon monoxide levels, oxygen levels, smoke levels, and volatile organic compound levels;
occupancy levels within one or more specific enclosures;
humidity data; and
sound levels.

14. The climate control system of claim 11, wherein the network of distributed servers is configured to automatically adjust operation of one or more of the climate control apparatuses, lighting elements, and the one or more valves in response to receipt of the at least one item of information.

15. The climate control system of claim 11, wherein one appliance hub is positioned above another appliance hub in a same enclosure.

16. The climate control system of claim 11, wherein machine learning is used to automatically adjust operation of one or more of the climate control apparatuses, lighting elements, and the one or more valves in response to receipt of the at least one item of information.

17. An appliance hub for use in an upper portion of an enclosure, the appliance hub comprising:
a substrate configured to be positioned in an upper portion of an enclosure;
a climate control apparatus mounted on the substrate, the climate control apparatus configured to regulate a temperature within the enclosure;
one or more lighting elements configured to provide light within the enclosure;
a plurality of fluid lines connected to the substrate and configured to provide fluid service and return to the climate control apparatus; and
a plurality of electrical connections connected to the substrate and configured to provide electrical power and/or data to at least one of the climate control apparatus and the one or more lighting elements;
wherein the substrate has a first face and a second face opposite the first face, wherein the first face faces away from the ground when the substrate is installed in an upper portion of an enclosure, and wherein the substrate has a rounded cross-section when observed from a direction normal to the second face.

18. The appliance hub of claim 17, wherein the substrate is substantially planar.

19. The appliance hub of claim 17, comprising a connection interface mounted on the substrate, the connection interface including a plurality of electrical, data, air, and/or fluid connection ports.

20. The appliance hub of claim 17, wherein the substrate comprises one or more conduits built into or onto the substrate, the one or more conduits configured to accommodate one or more fluid, air, electrical, and/or data connection structures.

21. The appliance hub of claim 17, further comprising a fire suppression apparatus and at least one valve mounted on or in the substrate and configured to control fluid flow to and from one or more of the climate control apparatus and the fire suppression apparatus.

22. The appliance hub of claim 17, further comprising a wireless signal generator connected to the substrate.

23. The appliance hub of claim 17, further comprising at least one of a sound level sensor, a motion sensor, an air quality monitor, a carbon dioxide sensor, a carbon monoxide sensor, a smoke detector, a light level sensor, a heat sensor, a room temperature sensor, a dewpoint sensor, and a humidity sensor.

24. The appliance hub of claim 17, wherein functionality of two or more of a sound level sensor, a motion sensor, an air quality monitor, a carbon dioxide sensor, a carbon monoxide sensor, a smoke detector, a light level sensor, a heat sensor, a room temperature sensor, a dewpoint sensor, and a humidity sensor are combined into a single sensor on the sound-absorbing substrate.

25. The appliance hub of claim 17, further comprising a sound-absorbing material mounted onto and/or into the substrate.

26. A climate control system comprising:
a plurality of the appliance hub of claim 17; and
a network of distributed servers hosted on the internet and configured to bilaterally communicate with the plurality of appliance hubs.

27. The climate control system of claim 26, further comprising at least one network hub configured to bilaterally communicate with one or both of the plurality of appliance hubs and the network of distributed servers.

28. The climate control system of claim 26, wherein the plurality of appliance hubs are configured to communicate at least one of the following items of information to one or both of the at least one network hub and the network of distributed servers:
temperature data;

air composition data, including one or more of carbon dioxide levels, carbon monoxide levels, oxygen levels, smoke levels, and volatile organic compound levels;
occupancy levels within one or more specific enclosures;
humidity data; and
sound levels.

29. The climate control system of claim 26, wherein the network of distributed servers is configured to automatically adjust operation of one or more of the climate control apparatuses, lighting elements, and the one or more valves in response to receipt of the at least one item of information.

30. The climate control system of claim 26, wherein one appliance hub is positioned above another appliance hub in a same enclosure.

31. The climate control system of claim 26, wherein machine learning is used to automatically adjust operation of one or more of the climate control apparatuses, lighting elements, and the one or more valves in response to receipt of the at least one item of information.

32. An appliance hub for use in an upper portion of an enclosure, the appliance hub comprising:
   a substrate configured to be positioned in an upper portion of an enclosure;
   a climate control apparatus mounted on the substrate, the climate control apparatus configured to regulate a temperature within the enclosure;
   one or more lighting elements configured to provide light within the enclosure;
   a plurality of fluid lines connected to the substrate and configured to provide fluid service and return to the climate control apparatus;
   a plurality of electrical connections connected to the substrate and configured to provide electrical power and/or data to at least one of the climate control apparatus and the one or more lighting elements;
   a fire suppression apparatus; and
   at least one valve mounted on or in the substrate and configured to control fluid flow to and from one or more of the climate control apparatus and the fire suppression apparatus.

33. The appliance hub of claim 32, wherein the substrate has a first face and a second face opposite the first face, wherein the first face faces away from the ground when the substrate is installed in an upper portion of an enclosure, and wherein the substrate has a polygonal cross-section when observed from a direction normal to the second face.

34. The appliance hub of claim 32, wherein the substrate has a first face and a second face opposite the first face, wherein the first face faces away from the ground when the substrate is installed in an upper portion of an enclosure, and wherein the substrate has a rounded cross-section when observed from a direction normal to the second face.

35. A climate control system comprising:
   a plurality of the appliance hub of claim 32; and
   a network of distributed servers hosted on the internet and configured to bilaterally communicate with the plurality of appliance hubs.

36. The climate control system of claim 35, further comprising at least one network hub configured to bilaterally communicate with one or both of the plurality of appliance hubs and the network of distributed servers.

37. The climate control system of claim 35, wherein the plurality of appliance hubs are configured to communicate at least one of the following items of information to one or both of the at least one network hub and the network of distributed servers:
   temperature data;
   air composition data, including one or more of carbon dioxide levels, carbon monoxide levels, oxygen levels, smoke levels, and volatile organic compound levels;
   occupancy levels within one or more specific enclosures;
   humidity data; and
   sound levels.

38. The climate control system of claim 35, wherein the network of distributed servers is configured to automatically adjust operation of one or more of the climate control apparatuses, lighting elements, and the one or more valves in response to receipt of the at least one item of information.

39. The climate control system of claim 35, wherein one appliance hub is positioned above another appliance hub in a same enclosure.

40. The climate control system of claim 35, wherein machine learning is used to automatically adjust operation of one or more of the climate control apparatuses, lighting elements, and the one or more valves in response to receipt of the at least one item of information.

41. An appliance hub for use in an upper portion of an enclosure, the appliance hub comprising:
   a substrate configured to be positioned in an upper portion of an enclosure;
   a climate control apparatus mounted on the substrate, the climate control apparatus configured to regulate a temperature within the enclosure;
   one or more lighting elements configured to provide light within the enclosure;
   a plurality of fluid lines connected to the substrate and configured to provide fluid service and return to the climate control apparatus; and
   a plurality of electrical connections connected to the substrate and configured to provide electrical power and/or data to at least one of the climate control apparatus and the one or more lighting elements;
   wherein functionality of two or more of a sound level sensor, a motion sensor, an air quality monitor, a carbon dioxide sensor, a carbon monoxide sensor, a smoke detector, a light level sensor, a heat sensor, a room temperature sensor, a dewpoint sensor, and a humidity sensor are combined into a single sensor on the sound-absorbing substrate.

42. The appliance hub of claim 41, wherein the substrate has a first face and a second face opposite the first face, wherein the first face faces away from the ground when the substrate is installed in an upper portion of an enclosure, and wherein the substrate has a polygonal cross-section when observed from a direction normal to the second face.

43. The appliance hub of claim 41, wherein the substrate has a first face and a second face opposite the first face, wherein the first face faces away from the ground when the substrate is installed in an upper portion of an enclosure, and wherein the substrate has a rounded cross-section when observed from a direction normal to the second face.

44. A climate control system comprising:
   a plurality of the appliance hub of claim 41; and
   a network of distributed servers hosted on the internet and configured to bilaterally communicate with the plurality of appliance hubs.

45. The climate control system of claim 44, further comprising at least one network hub configured to bilaterally communicate with one or both of the plurality of appliance hubs and the network of distributed servers.

46. The climate control system of claim 44, wherein the plurality of appliance hubs are configured to communicate at least one of the following items of information to one or both of the at least one network hub and the network of distributed servers:
- temperature data;
- air composition data, including one or more of carbon dioxide levels, carbon monoxide levels, oxygen levels, smoke levels, and volatile organic compound levels;
- occupancy levels within one or more specific enclosures;
- humidity data; and
- sound levels.

47. The climate control system of claim 44, wherein the network of distributed servers is configured to automatically adjust operation of one or more of the climate control apparatuses, lighting elements, and the one or more valves in response to receipt of the at least one item of information.

48. The climate control system of claim 44, wherein one appliance hub is positioned above another appliance hub in a same enclosure.

49. The climate control system of claim 44, wherein machine learning is used to automatically adjust operation of one or more of the climate control apparatuses, lighting elements, and the one or more valves in response to receipt of the at least one item of information.

* * * * *

UNITED STATES PATENT AND TRADEMARK OFFICE
CERTIFICATE OF CORRECTION

| | |
|---|---|
| PATENT NO. | : 11,487,307 B2 |
| APPLICATION NO. | : 16/459509 |
| DATED | : November 1, 2022 |
| INVENTOR(S) | : Dean C. Allen et al. |

It is certified that error appears in the above-identified patent and that said Letters Patent is hereby corrected as shown below:

In the Specification

In Column 1, Line 24, delete "(MAP)" and insert --(MEP)-- therefor.

In Column 1, Line 32, delete "("VA")" and insert --("VAV")-- therefor.

In Column 1, Line 33, delete "("CAVE")" and insert --("CAV")-- therefor.

In Column 1, Line 38, delete "ducking," and insert --ducting,-- therefor.

In Column 2, Line 49, delete "ducking" and insert --ducting-- therefor.

In Column 3, Line 5, delete "retrofit ted" and insert --retrofitted-- therefor.

In Column 3, Line 21, delete "And" and insert --and-- therefor.

In Column 3, Line 29, delete "App lance" and insert --appliance-- therefor.

In Column 3, Line 54, delete "affected" and insert --effected-- therefor.

In Column 3, Line 65, delete "roughen ed," and insert --roughened,-- therefor.

In Column 4, Line 4, delete "CL" and insert --UL-- therefor.

In Column 4, Line 8, delete "CL/ETL" and insert --UL/ETL-- therefor.

In Column 4, Lines 24-25, delete "releasbly" and insert --releasably-- therefor.

In Column 4, Line 27, delete "And/or" and insert --and/or-- therefor.

Signed and Sealed this
Thirty-first Day of January, 2023

Katherine Kelly Vidal
*Director of the United States Patent and Trademark Office*

CERTIFICATE OF CORRECTION (continued)
U.S. Pat. No. 11,487,307 B2

In Column 4, Line 43, delete "Offices" and insert --offices-- therefor.

In Column 4, Line 44, delete "Conference" and insert --conference-- therefor.

In Column 4, Line 64, delete "(RIB)" and insert --(RGB)-- therefor.

In Column 5, Line 52, delete "ducking" and insert --ducting-- therefor.

In Column 5, Lines 57-58, delete "fluoro protein," and insert --fluoroprotein,-- therefor.

In Column 6, Line 13, delete "ducking," and insert --ducting,-- therefor.

In Column 6, Line 33, delete "seismic ally" and insert --seismically-- therefor.

In Column 7, Line 10, delete "releasbly" and insert --releasably-- therefor.

In Column 7, Line 41, delete "Via" and insert --via-- therefor.

In Column 7, Line 42, delete "RID" and insert --RFID-- therefor.

In Column 7, Line 45, delete "monitor able" and insert --monitorable-- therefor.

In Column 7, Line 56, delete "retrofit ting" and insert --retrofitting-- therefor.

In Column 9, Line 10, delete "ducking" and insert --ducting-- therefor.

In Column 9, Line 12, delete "ducking" and insert --ducting-- therefor.

In Column 9, Line 14, delete "ducking" and insert --ducting-- therefor.

In Column 9, Line 16, delete "ducking" and insert --ducting-- therefor.

In Column 10, Line 1, delete "ail" and insert --all-- therefor.

In Column 10, Line 18, delete "undercount" and insert --undermount-- therefor.

In Column 11, Line 51, delete "ducking," and insert --ducting,-- therefor.

In Column 15, Line 28, before "QR", insert --(e.g.,--.

In Column 15, Line 41, delete "retrofit ting." and insert --retrofitting.-- therefor.